US012342158B2

(12) United States Patent
Audfray et al.

(10) Patent No.: US 12,342,158 B2
(45) **Date of Patent: *Jun. 24, 2025**

(54) NEAR-FIELD AUDIO RENDERING

(71) Applicant: Magic Leap, Inc., Plantation, FL (US)

(72) Inventors: Remi Samuel Audfray, San Francisco, CA (US); Jean-Marc Jot, Aptos, CA (US); Samuel Charles Dicker, San Francisco, CA (US); Mark Brandon Hertensteiner, San Jose, CA (US); Justin Dan Mathew, Fort Lauderdale, FL (US); Anastasia Andreyevna Tajik, Fort Lauderdale, FL (US); Nicholas John LaMartina, Portland, ME (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,089

(22) Filed: Jul. 1, 2024

(65) Prior Publication Data

US 2024/0357311 A1 Oct. 24, 2024

Related U.S. Application Data

(63) Continuation of application No. 18/451,794, filed on Aug. 17, 2023, now Pat. No. 12,063,497, which is a (Continued)

(51) Int. Cl.
*H04S 3/00* (2006.01)
*H04R 5/033* (2006.01)

(Continued)

(52) U.S. Cl.
CPC ............. *H04S 7/304* (2013.01); *H04R 5/033* (2013.01); *H04R 5/04* (2013.01); *H04S 3/008* (2013.01);

(Continued)

(58) Field of Classification Search
CPC .......... H04S 3/004; H04S 7/302; H04S 7/303; H04S 7/304; H04S 7/306; H04S 2400/11;

(Continued)

(56) References Cited

U.S. PATENT DOCUMENTS 4,852,988 A 8/1989 Velez
5,596,644 A 1/1997 Abel et al.

(Continued)

FOREIGN PATENT DOCUMENTS

CA 2316473 A1 1/2001
CA 2362895 A1 12/2002

(Continued)

OTHER PUBLICATIONS

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf , retrieved on Oct. 26, 2020.

(Continued)

*Primary Examiner* — Kile O Blair
(74) *Attorney, Agent, or Firm* — Morrison & Foerster LLP

(57) ABSTRACT

Examples of the disclosure describe systems and methods for presenting an audio signal to a user of a wearable head device. According to an example method, a source location corresponding to the audio signal is identified. For each of the respective left and right ear of the user, a virtual speaker position, of a virtual speaker array, is determined, the virtual speaker position collinear with the source location and with a position of the respective ear. For each of the respective left and right ear of the user, a head-related transfer function (HRTF) corresponding to the virtual speaker position and to the respective ear is determined; and the output audio signal (Continued)

is presented to the respective ear of the user via one or more speakers associated with the wearable head device. Processing the audio signal includes applying the HRTF to the audio signal.

20 Claims, 22 Drawing Sheets

Related U.S. Application Data continuation of application No. 18/061,367, filed on Dec. 2, 2022, now Pat. No. 11,778,411, which is a continuation of application No. 17/401,090, filed on Aug. 12, 2021, now Pat. No. 11,546,716, which is a continuation of application No. 16/593,943, filed on Oct. 4, 2019, now Pat. No. 11,122,383.

(60) Provisional application No. 62/812,734, filed on Mar. 1, 2019, provisional application No. 62/741,677, filed on Oct. 5, 2018.

(51) Int. Cl.
*H04R 5/04* (2006.01)
*H04S 7/00* (2006.01)

(52) U.S. Cl.
CPC ....... *H04S 2400/01* (2013.01); *H04S 2400/11* (2013.01); *H04S 2420/01* (2013.01)

(58) Field of Classification Search
CPC ..... H04S 2420/01; H04S 1/005; H04R 5/033; H04R 25/552
See application file for complete search history.

(56) References Cited

U.S. PATENT DOCUMENTS

| | | | |
|---|---|---|---|
| 6,433,760 | B1 | 8/2002 | Vaissie |
| 6,491,391 | B1 | 12/2002 | Blum et al. |
| 6,546,105 | B1 | 4/2003 | Katayama et al. |
| 6,819,762 | B2 | 11/2004 | Jones et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,767,968 | B2 | 7/2014 | Flaks et al. |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,720,505 | B2 | 8/2017 | Gribetz et al. |
| 9,955,281 | B1 | 4/2018 | Lyren et al. |
| 9,992,602 | B1 | 6/2018 | Allen |
| 10,013,053 | B2 | 7/2018 | Cederlund et al. |
| 10,025,379 | B2 | 7/2018 | Drake et al. |
| 11,122,383 | B2 | 9/2021 | Audfray et al. |
| 11,212,636 | B2 | 12/2021 | Tajik |
| 11,546,716 | B2 | 1/2023 | Audfray et al. |
| 11,589,182 | B2 | 2/2023 | Tajik |
| 11,736,888 | B2 | 8/2023 | Tajik |
| 11,778,411 | B2 | 10/2023 | Audfray et al. |
| 11,956,620 | B2 | 4/2024 | Tajik |
| 12,063,497 | B2 | 8/2024 | Audfray |
| 2003/0030597 | A1 | 2/2003 | Geist |
| 2006/0023158 | A1 | 2/2006 | Howell et al. |
| 2009/0003614 | A1 | 1/2009 | Neunaber |
| 2009/0180624 | A1 | 7/2009 | Nakayama |
| 2010/0080396 | A1 | 4/2010 | Aoyagi |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0093320 | A1 | 4/2012 | Flaks et al. |
| 2012/0206452 | A1 | 8/2012 | Geisner et al. |
| 2013/0077147 | A1 | 3/2013 | Efimov |
| 2013/0120224 | A1 | 5/2013 | Cajigas |
| 2013/0236040 | A1 | 9/2013 | Crawford |
| 2014/0195918 | A1 | 7/2014 | Friedlander |
| 2014/0320389 | A1 | 10/2014 | Scavezze |
| 2015/0168731 | A1 | 6/2015 | Robbins |
| 2015/0373474 | A1 | 12/2015 | Kraft et al. |
| 2016/0025982 | A1 | 1/2016 | Sutherland |
| 2016/0134987 | A1 | 5/2016 | Gorzel et al. |
| 2016/0163110 | A1 | 6/2016 | Chang et al. |
| 2017/0153866 | A1 | 6/2017 | Grinberg |
| 2017/0223478 | A1 | 8/2017 | Jot |
| 2018/0101990 | A1 | 4/2018 | Yang et al. |
| 2018/0109901 | A1 | 4/2018 | Laaksonen |
| 2018/0321894 | A1 | 11/2018 | Paulovich et al. |
| 2018/0341455 | A1 | 11/2018 | Ivanov |
| 2019/0102956 | A1 | 4/2019 | Ishihara |
| 2019/0293609 | A1 | 9/2019 | Oh |
| 2019/0313201 | A1 | 10/2019 | Torres et al. |
| 2024/0205630 | A1 | 6/2024 | Tajik |

FOREIGN PATENT DOCUMENTS

| | | | |
|---|---|---|---|
| CA | 2388766 | A1 | 12/2003 |
| GB | 2536020 | A | 9/2016 |
| WO | 2015072091 | A1 | 5/2015 |
| WO | 2015192117 | A1 | 12/2015 |
| WO | 2017183346 | A1 | 10/2017 |
| WO | 2018132235 | A1 | 7/2018 |

OTHER PUBLICATIONS

Carmigniani, J., et al., "Augmented Reality Technologies, Systems and Applications," Multimedia Tools and Applications, 51(1):341-77 (Dec. 2010) ("Augmented Reality Technologies").
Declaration of Dr. Stephen C. Thompson Under 37 C.F.R. § 1.132 including Appendix A (List of Materials Considered) and Appendix B (Curriculum Vitae) and Incorporated Claim Charts CC-1-CC-9.
Feiner, S., "The Importance of Being Mobile: Some Social Consequences of Wearable Augmented Reality Systems," Proceedings 2nd IEEE and ACM International Workshop on Augmented Reality (IWAR'99) (Oct. 1999).
Milgram, P. and Kishino, F., "A Taxonomy of Mixed Reality Visual Displays," IEICE Transactions on Information & Systems, E77-D(12):1321-29 (Dec. 1994) ("Taxonomy of Mixed Reality").
Non-Final Office Action mailed Sep. 18, 2024, for U.S. Appl. No. 18/587,728, filed Feb. 26, 2024, thirty-three pages.
Prosecution History of U.S. Pat. No. 11,212,636.
Chinese Notice of Allowance dated Jan. 16, 2023, for CN Application No. 201980080065.2, with English translation, 6 pages.
Chinese Notice of Allowance dated Jan. 26, 2022, for CN Application No. 201980012942.2, with English translation, six pages.
Chinese Notice of Allowance dated Jan. 4, 2024, for CN Application No. 202210301214.7, with English translation, six pages.
Chinese Office Action dated Jul. 16, 2021, for CN Application No. 201980012942.2, with English translation, 16 pages.
Chinese Office Action dated Jul. 20, 2022, for CN Application No. 201980080065.2, with English translation 15 pages.
Chinese Office Action dated Sep. 1, 2023, for CN Application No. 202210301214.7, with English translation, 7 pages.
European Office Action dated Oct. 10, 2023, for EP Application No. 19869249.3, six pages.
European Search Report mailed Nov. 30, 2021, for EP Application No. 19869249.3, six pages.
Final Office Action mailed Nov. 12, 2020, for U.S. Appl. No. 16/593,943, filed Oct. 4, 2019, 17 pages.
International Preliminary Report on Patentability and Written Opinion dated Apr. 15, 2021, for PCT Application No. PCT/US2019/054893, filed Oct. 4, 2019, eleven pages.

(56) References Cited

OTHER PUBLICATIONS

International Preliminary Report on Patentability dated Aug. 18, 2020, for PCT Application No. PCT/US2019/018369, filed Feb. 15, 2019, five pages.
International Search Report and Written Opinion, mailed May 7, 2019, for PCT Application No. PCT/US2019/18369, filed Feb. 15, 2019, eleven pages.
International Search Report dated Jan. 10, 2020, for PCT Application No. PCT/US2019/054893, filed Oct. 4, 2019, one page.
Israeli Notice of Allowance dated Dec. 22, 2022, for IL Application No. 276496, three pages.
Israeli Notice of Allowance dated Jul. 12, 2023, for IL Application No. 301445, four pages.
Israeli Notice of Allowance dated Jul. 9, 2024, for IL Application No. 307545, four pages.
Israeli Notice of Allowance dated Jun. 16, 2024, for IL Application No. 307545, three pages.
Jacob, R. "Eye Tracking in Advanced Interface Design", Virtual Environments and Advanced Interface Design, Oxford University Press, Inc. (Jun. 1995).
Japanese Notice of Allowance mailed Dec. 28, 2023, for JP Application No. 2022-196982, with English translation, six pages.
Yoshida, A. et al., "Design and Applications of a High Resolution Insert Head Mounted Display", (Jun. 1994).
Japanese Notice of Allowance mailed Nov. 22, 2024, for JP Application No. 2023-047790, with English translation, 6 pages.
Ex Parte Reexamination Communication mailed Mar. 20, 2025, for U.S. Appl. No. 90/019,640, filed Aug. 29, 2024, for U.S. Pat. No. 11,212,636, forty-one pages.
Japanese Notice of Allowance mailed Mar. 24, 2025, for JP Application No. 2024037946, with English translation, 6 pages.
Notice of Allowance mailed Mar. 27, 2025, for U.S. Appl. No. 18/587,728, filed Feb. 26, 2024, nineteen pages.
Japanese Notice of Allowance mailed Apr. 9, 2025, for JP Application No. 2024-135322, with English translation, 6 pages.
Japanese Notice of Allowance mailed Feb. 16, 2024, for JP Application No. 2022-160027, with English translation, six pages.
Japanese Notice of Allowance mailed Feb. 28, 2023, for JP Application No. 2020-543356, with English translation, 6 pages.
Japanese Notice of Allowance mailed Nov. 10, 2022, for JP Application No. 2021-518639, with English translation, six pages.
Japanese Office Action mailed May 29, 2024, for JP Application No. 2023-047790, with English translation, 8 pages.
Japanese Office Action mailed Oct. 20, 2023, for JP Application No. 2022-160027, with English translation, 4 pages.
Non-Final Office Action mailed Apr. 13, 2023, for U.S. Appl. No. 18/061,367, filed Dec. 2, 2022, nine pages.
Non-Final Office Action mailed Jul. 7, 2020, for U.S. Appl. No. 16/593,943, filed Oct. 4, 2019, 13 pages.
Non-Final Office Action mailed Mar. 28, 2024, for U.S. Appl. No. 18/451,794, filed Aug. 17, 2023, five pages.
Notice of Allowability (corrected) mailed Jun. 18, 2021, for U.S. Appl. No. 16/593,943, filed Oct. 4, 2019, 6 pages.
Notice of Allowance (corrected) mailed Feb. 14, 2024, for U.S. Appl. No. 18/340,744, filed Jun. 23, 2023, twelve pages.
Notice of Allowance mailed Aug. 18, 2021, for U.S. Appl. No. 16/970,324, filed Aug. 14, 2020, 11 pages.
Notice of Allowance mailed Jan. 26, 2024, for U.S. Appl. No. 18/340,744, filed Jun. 23, 2023, fifteen pages.
Notice of Allowance mailed Jul. 20, 2023, for U.S. Appl. No. 18/061,367, filed Dec. 2, 2022, five pages.
Notice of Allowance mailed Mar. 29, 2021, for U.S. Appl. No. 16/593,943, filed Oct. 4, 2019, eight pages.
Notice of Allowance mailed May 24, 2023, for U.S. Appl. No. 18/047,168, filed Oct. 17, 2022, eighteen pages.
Notice of Allowance mailed May 30, 2024, for U.S. Appl. No. 18/451,794, filed Aug. 17, 2023, five pages.
Notice of Allowance mailed Sep. 16, 2022, for U.S. Appl. No. 17/528,473, filed Nov. 17, 2021, 13 pages.
Notice of Allowance mailed Sep. 7, 2022, for U.S. Appl. No. 17/401,090, filed Aug. 12, 2021, five pages.
Olson, H. F. (Mar. 1973). "Gradient loudspeakers," RCA Laboratories, Princeton, N. J., Journal of the Audio Engineering Society, vol. 21, 86-93.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Wenzel, E. M., et al.: "Sound Lab: A real-time, software-based system for the study of spatial hearing", Internet Citation, Feb. 19, 2000 (Feb. 19, 2000), Retrieved from the Internet: URL:http://pddocserv/specdocs/data/handbooks/AES/Conv-Preprints/2000/PP0002/5140.pdf [retrieved on Mar 26, 2007] *Sections 2.1, 2.2*.

NEAR-FIELD AUDIO RENDERING

REFERENCE TO RELATED APPLICATIONS

This application is a continuation of U.S. patent application Ser. No. 18/451,794, filed on Aug. 17, 2023, which is a continuation of U.S. patent application Ser. No. 18/061,367, filed on Dec. 2, 2022, now U.S. Pat. No. 11,778,411, which is a continuation of U.S. patent application Ser. No. 17/401,090, filed on Aug. 12, 2021, now U.S. Pat. No. 11,546,716, which is a continuation of U.S. patent application Ser. No. 16/593,943, filed on Oct. 4, 2019, now U.S. Pat. No. 11,122,383, which claims priority to U.S. Provisional Application No. 62/741,677, filed on Oct. 5, 2018, and to U.S. Provisional Application No. 62/812,734, filed on Mar. 1, 2019, the contents of which are incorporated by reference herein in their entirety.

FIELD

This disclosures relates generally to systems and methods for audio signal processing, and in particular to systems and methods for presenting audio signals in a mixed reality environment.

BACKGROUND

Augmented reality and mixed reality systems place unique demands on the presentation of binaural audio signals to a user. On one hand, presentation of audio signals in a realistic manner—for example, in a manner consistent with the user's expectations—is crucial for creating augmented or mixed reality environments that are immersive and believable. On the other hand, the computational expense of processing such audio signals can be prohibitive, particularly for mobile systems that may feature limited processing power and battery capacity.

One particular challenge is the simulation of near-field audio effects. Near-field effects are important for re-creating impression of a sound source coming very close to a user's head. Near-field effects can be computed using databases of head-related transfer functions (HRTFs). However, typical HRTF databases include HRTFs measured at a single distance in a far-field from the user's head (e.g., more than 1 meter from the user's head), and may lack HRTFs at distances suitable for near-field effects. And even if the HRTF databases included measured or simulated HRTFs for different distances from the user's head (e.g., less than 1 meter from the user's head), it may be computationally expensive to directly use a high number of HRTFs for real-time audio rendering applications. Accordingly, systems and methods are desired for modeling near-field audio effects using far-field HRTFs in a computationally efficient manner.

BRIEF SUMMARY

Examples of the disclosure describe systems and methods for presenting an audio signal to a user of a wearable head device. According to an example method, a source location corresponding to the audio signal is identified. An acoustic axis corresponding to the audio signal is determined. For each of a respective left and right ear of the user, an angle between the acoustic axis and the respective ear is determined. For each of the respective left and right ear of the user, a virtual speaker position, of a virtual speaker array, is determined, the virtual speaker position collinear with the source location and with a position of the respective ear. The virtual speaker array comprises a plurality of virtual speaker positions, each virtual speaker position of the plurality located on the surface of a sphere concentric with the user's head, the sphere having a first radius. For each of the respective left and right ear of the user, a head-related transfer function (HRTF) corresponding to the virtual speaker position and to the respective ear is determined; a source radiation filter is determined based on the determined angle; the audio signal is processed to generate an output audio signal for the respective ear; and the output audio signal is presented to the respective ear of the user via one or more speakers associated with the wearable head device. Processing the audio signal comprises applying the HRTF and the source radiation filter to the audio signal.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
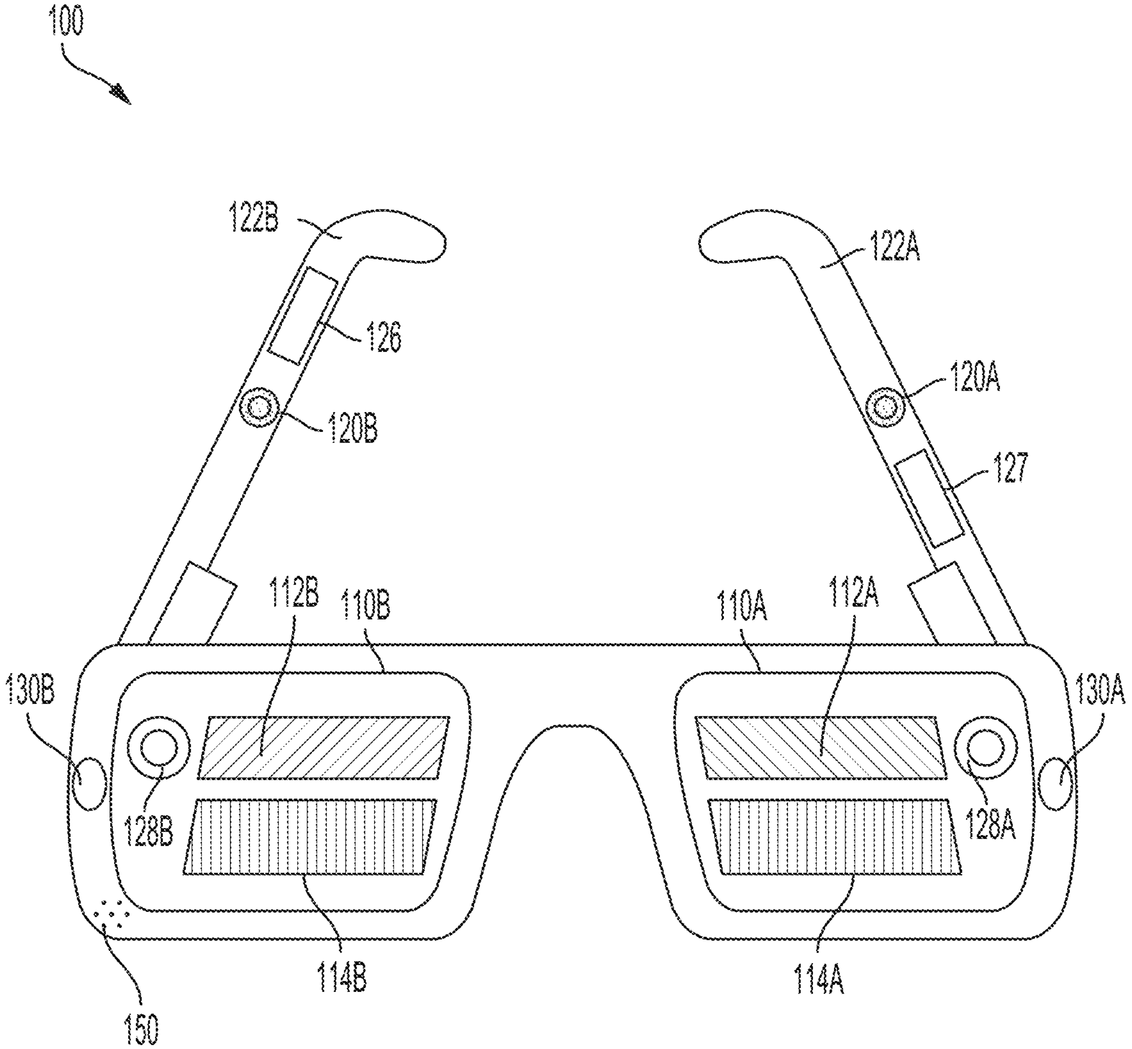
FIG. 1 illustrates an example wearable system, according to some embodiments of the disclosure.

FIG. 1 illustrates an example wearable head device 100 configured to be worn on the head of a user. Wearable head device 100 may be part of a broader wearable system that includes one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can include one or more displays, such as displays 110A and 110B (which may include left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMUs, e.g. IMU 126), acoustic sensors (e.g., microphones 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements) (e.g., eye cameras 128A and 128B). However, wearable head device 100 can incorporate any suitable display technology, and any suitable number, type, or combination of sensors or other components without departing from the scope of the disclosure. In some examples, wearable head device 100 may incorporate one or more microphones 150 configured to detect audio signals generated by the user's voice; such microphones may be positioned adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
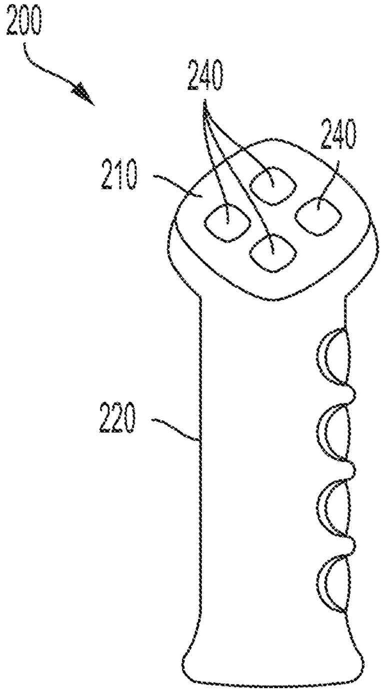
FIG. 2 illustrates an example handheld controller that can be used in conjunction with an example wearable system, according to some embodiments of the disclosure.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
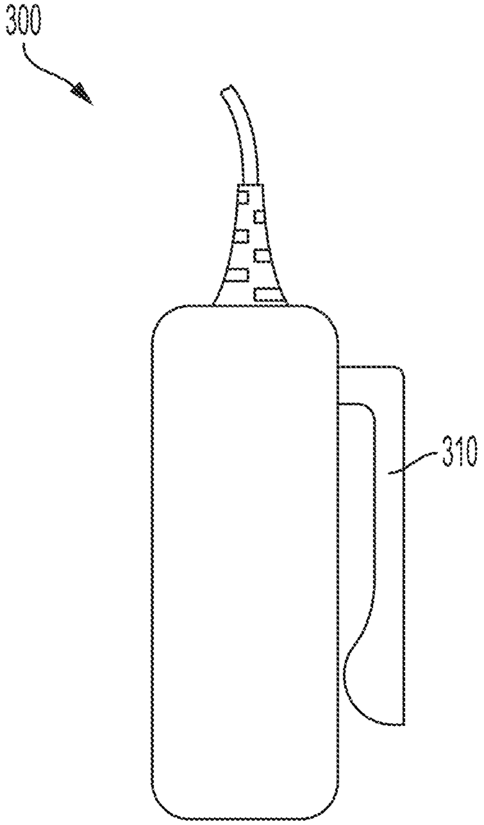
FIG. 3 illustrates an example auxiliary unit that can be used in conjunction with an example wearable system, according to some embodiments of the disclosure.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
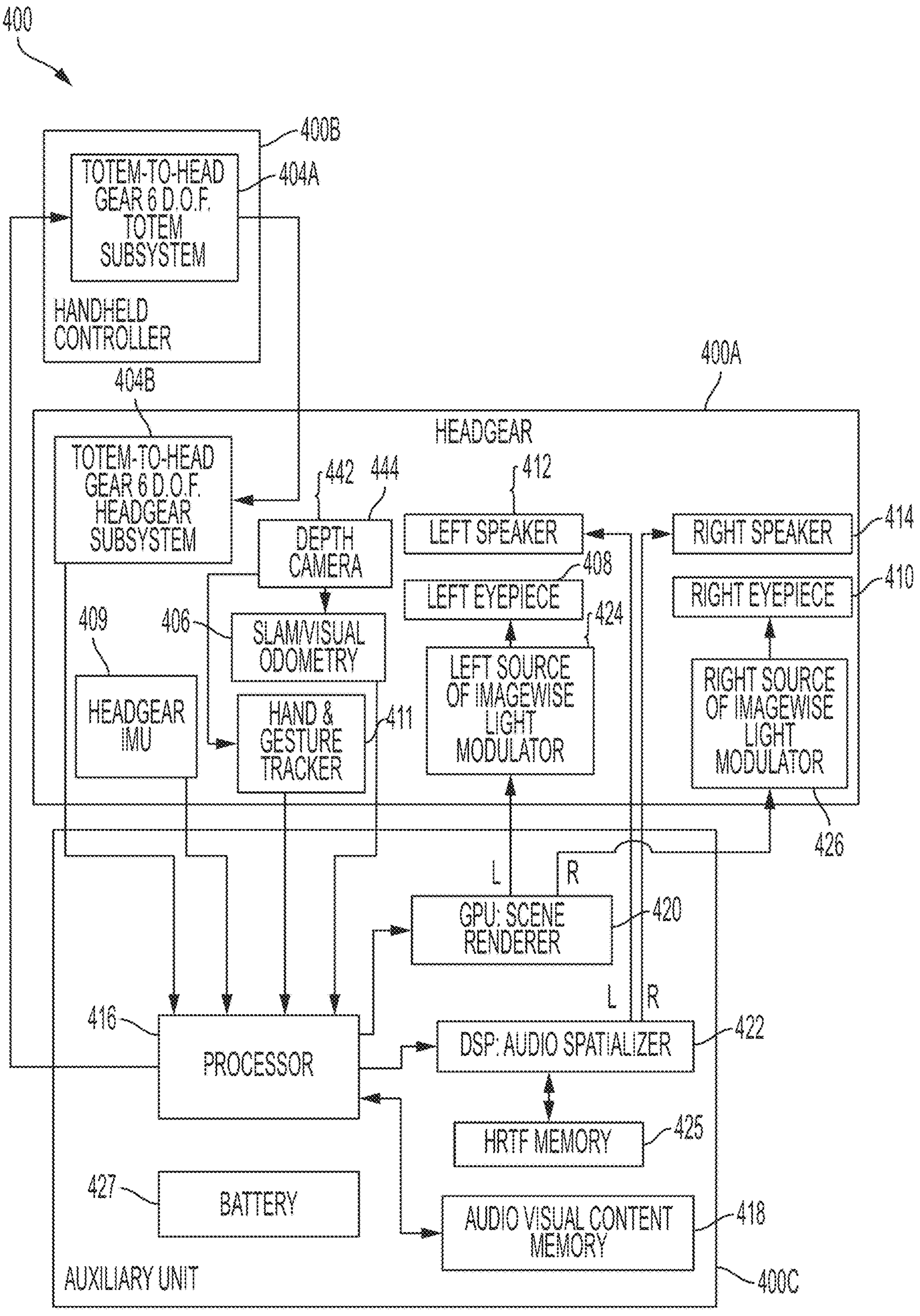
FIG. 4 illustrates an example functional block diagram for an example wearable system, according to some embodiments of the disclosure.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example headgear device 400A (which may correspond to wearable head device 100 described above); the headgear device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the headgear device 400A. The six degrees of freedom may be expressed relative to a coordinate system of the headgear device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the headgear device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear device 400A can include an optical target for optical tracking in conjunction with the camera. In some examples, the headgear device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the headgear device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to headgear device 400A) to an inertial coordinate space, or to an environmental coordinate space. For instance, such transformations may be necessary for a display of headgear device 400A to present a virtual object at an expected position and orientation relative to the real environment (e.g., a virtual person sitting in a real chair, facing forward, regardless of the position and orientation of headgear device 400A), rather than at a fixed position and orientation on the display (e.g., at the same position in the display of headgear device 400A). This can maintain an illusion that the virtual object exists in the real environment (and does not, for example, appear positioned unnaturally in the real environment as the headgear device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the headgear device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of headgear device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of headgear device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, microphones 450; and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to headgear device 400A and/or handheld controller 400B. Including such components in an auxiliary unit, which can be mounted to a user's waist, can limit the size and weight of headgear device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Audio Rendering

The systems and methods described below can be implemented in an augmented reality or mixed reality system, such as described above. For example, one or more processors (e.g., CPUs, DSPs) of an augmented reality system can be used to process audio signals or to implement steps of computer-implemented methods described below; sensors of the augmented reality system (e.g., cameras, acoustic sensors, IMUs, LIDAR, GPS) can be used to determine a position and/or orientation of a user of the system, or of elements in the user's environment; and speakers of the augmented reality system can be used to present audio signals to the user. In some embodiments, external audio playback devices (e.g. headphones, earbuds) could be used instead of the system's speakers for delivering the audio signal to the user's ears.

In augmented reality or mixed reality systems such as described above, one or more processors (e.g., DSP audio spatializer 422) can process one or more audio signals for presentation to a user of a wearable head device via one or more speakers (e.g., left and right speakers 412/414 described above). Processing of audio signals requires tradeoffs between the authenticity of a perceived audio signal—for example, the degree to which an audio signal presented to a user in a mixed reality environment matches the user's expectations of how an audio signal would sound in a real environment—and the computational overhead involved in processing the audio signal.

Modeling near-field audio effects can improve the authenticity of a user's audio experience, but can be computationally prohibitive. In some embodiments, an integrated solution may combine a computationally efficient rendering approach with one or more near-field effects for each ear. The one or more near-field effects for each ear may include, for example, parallax angles in simulation of sound incident for each ear, interaural time difference (ITDs) based on object position and anthropometric data, near-field level changes due to distance, and/or magnitude response changes due to proximity to the user's head and/or source radiation variation due to parallax angles. In some embodiments, the integrated solution may be computationally efficient so as to not excessively increase computational cost.

In a far-field, as a sound source moves closer or farther from a user, changes at the user's ears may be the same for each ear and may be an attenuation of a signal for the sound source. In a near-field, as a sound source moves closer or farther from the user, changes at the user's cars may be different for each ear and may be more than just attenuations of the signal for the sound source. In some embodiments, the near-field and far-field boundaries may be where the conditions change.

In some embodiments, a virtual speaker array (VSA) may be a discrete set of positions on a sphere centered at a center of the user's head. For each position on the sphere, a pair (e.g., left-right pair) of HRTFs is provided. In some embodiments, a near-field may be a region inside the VSA and a far-field may be a region outside the VSA. At the VSA, either a near-field approach or a far-field approach may be used.

A distance from a center of the user's head to a VSA may be a distance at which the HRTFs were obtained. For example, the HRTF filters may be measured or synthesized from simulation. The measured/simulated distance from the VSA to the center of the user's head may be referred to as "measured distance" (MD). A distance from a virtual sound source to the center of the user's head may be referred to as "source distance" (SD).

Figure 5:
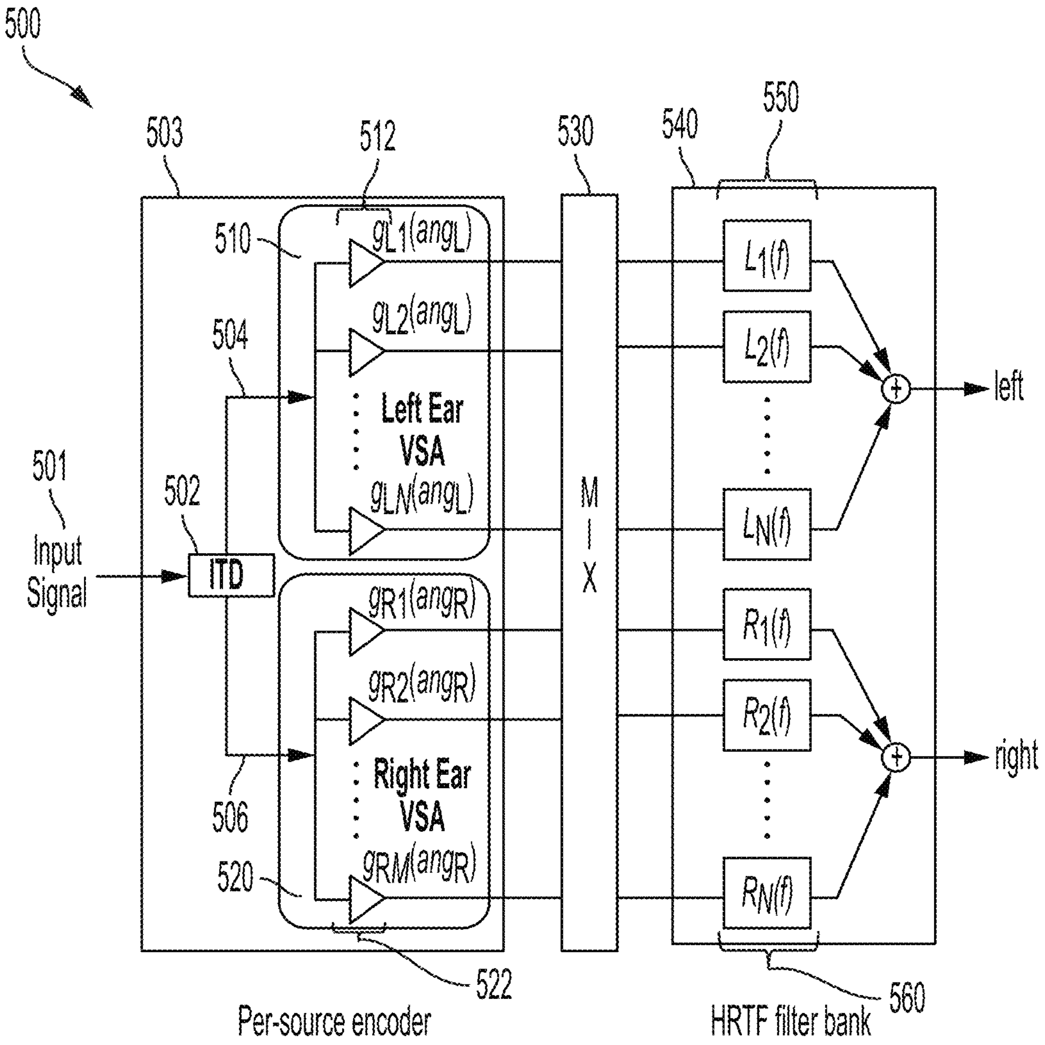
FIG. 5 illustrates a binaural rendering system, according to some embodiments of the disclosure.

FIG. 5 illustrates a binaural rendering system 500, according to some embodiments. In the example system of FIG. 5, a mono input audio signal 501 (which can represent a virtual sound source) is split by an interaural time delay (ITD) module 502 of an encoder 503 into a left signal 504 and a right signal 506. In some examples, the left signal 504 and the right signal 506 may differ by an ITD (e.g., in milliseconds) determined by the ITD module 502. In the example, the left signal 504 is input to a left ear VSA module 510 and the right signal 506 is input to a right ear VSA module 520.

In the example, the left ear VSA module 510 can pan the left signal 504 over a set of N channels respectively feeding a set of left-ear HRTF filters 550 ($L_1, \ldots L_N$) in a HRTF filter bank 540. The left-ear HRTF filters 550 may be substantially delay-free. Panning gains 512 ($g_{L1}, \ldots g_{LN}$) of the left ear VSA module may be functions of a left incident angle ($ang_L$). The left incident angle may be indicative of a direction of incidence of sound relative to a frontal direction from the center of the user's head. Though shown from a top-down perspective with respect to the user's head in the figure, the left incident angle can comprise an angle in three dimensions; that is, the left incident angle can include an azimuth and/or an elevation angle.

Similarly, in the example, the right ear VSA module 520 can pan the right signal 506 over a set of M channels respectively feeding a set of right-ear HRTF filters 560 ($R_1, \ldots R_M$) in the HRTF filter bank 540. The right-ear HRTF filters 550 may be substantially delay-free. (Although only one HRTF filter bank is shown in the figure, multiple HRTF filter banks, including those stored across distributed systems, are contemplated.) Panning gains 522 ($g_{R1}, \ldots g_{RM}$) of the right ear VSA module may be functions of a right incident angle ($ang_R$). The right incident angle may be indicative of a direction of incidence of sound relative to the frontal direction from the center of the user's head. As above, the right incident angle can comprise an angle in three dimensions; that is, the right incident angle can include an azimuth and/or an elevation angle.

In some embodiments, such as shown, the left ear VSA module 510 may pan the left signal 504 over N channels and the right ear VSA module may pan the right signal over M channels. In some embodiments, N and M may be equal. In some embodiments, N and M may be different. In these embodiments, the left ear VSA module may feed into a set of left-ear HRTF filters ($L_1, \ldots L_N$) and the right ear VSA module may feed into a set of right-ear HRTF filters ($R_1, \ldots R_M$), as described above. Further, in these embodiments, panning gains ($g_{L1}, \ldots g_{LN}$) of the left ear VSA module may be functions of a left ear incident angle ($ang_L$) and panning gains ($g_{R1}, \ldots g_{RM}$) of the right ear VSA module may be functions of a right ear incident angle ($ang_R$), as described above.

The example system illustrates a single encoder 503 and corresponding input signal 501. The input signal may correspond to a virtual sound source. In some embodiments, the system may include additional encoders and corresponding input signals. In these embodiments, the input signals may correspond to virtual sound sources. That is, each input signal may correspond to a virtual sound source.

In some embodiments, when simultaneously rendering several virtual sound sources, the system may include an encoder per virtual sound source. In these embodiments, a mix module (e.g., 530 in FIG. 5) receives outputs from each of the encoders, mixes the received signals, and outputs mixed signals to the left and right HRTF filters of the HRTF filter bank.

Figure 6A:
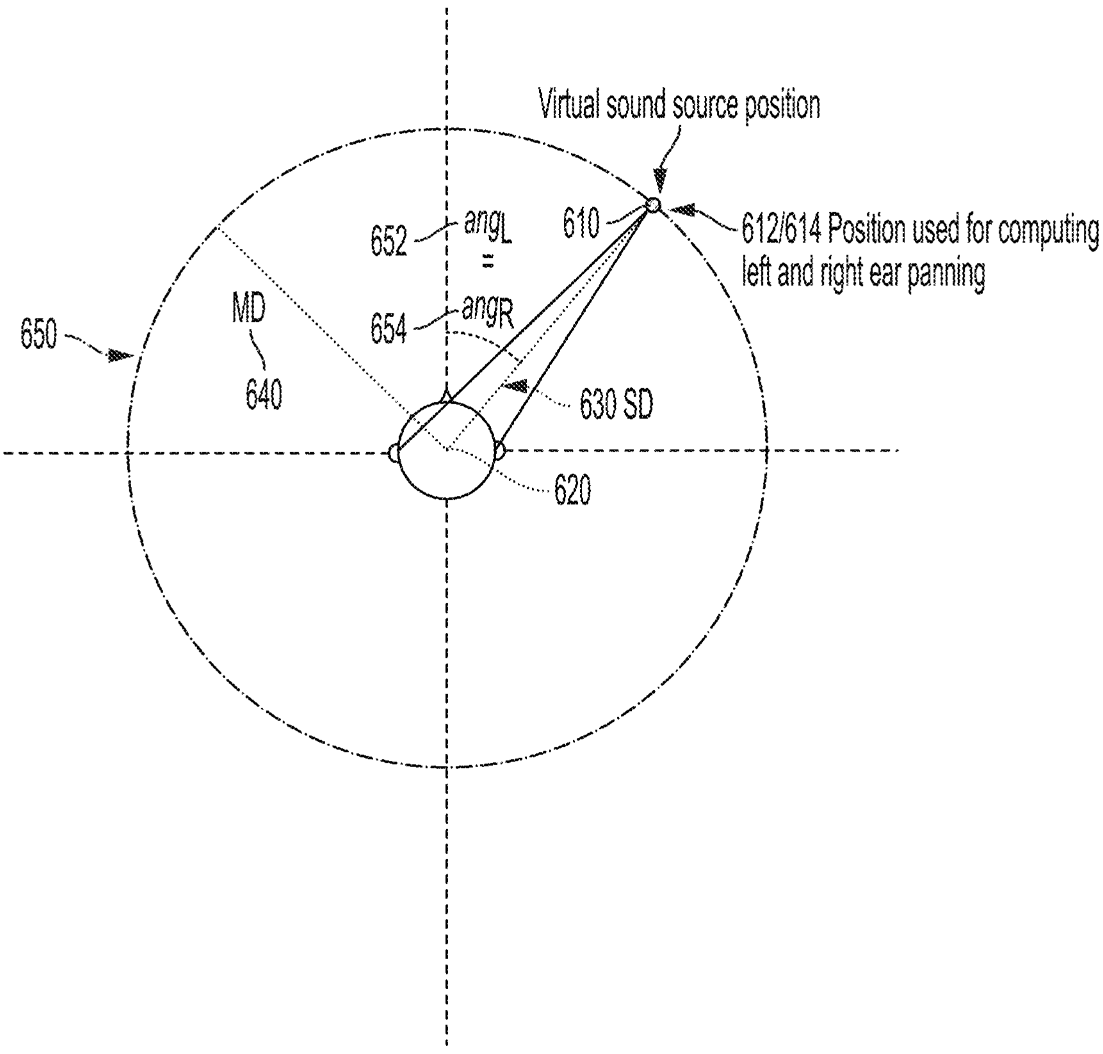
FIGS. 6A-6C illustrate example geometry of modeling audio effects from a virtual sound source, according to some embodiments of the disclosure.

FIG. 6A illustrates a geometry for modeling audio effects from a virtual sound source, according to some embodiments. A distance 630 of the virtual sound source 610 to a center 620 of a user's head (e.g., "source distance" (SD)) is equal to a distance 640 from a VSA 650 to the center of the user's head (e.g., "measured distance" (MD)). As illustrated in FIG. 6A, a left incident angle 652 ($ang_L$) and a right incident angle 654 ($ang_R$) are equal. In some embodiments, an angle from the center 620 of the user's head to the virtual sound source 610 may be used directly for computing panning gains (e.g., $g_{L1}, \ldots, g_{LN}, g_{R1}, \ldots, g_{RN}$). In the example shown, the virtual sound source position 610 is used as the position (612/614) for computing left ear panning and right ear panning.

Figure 6B:
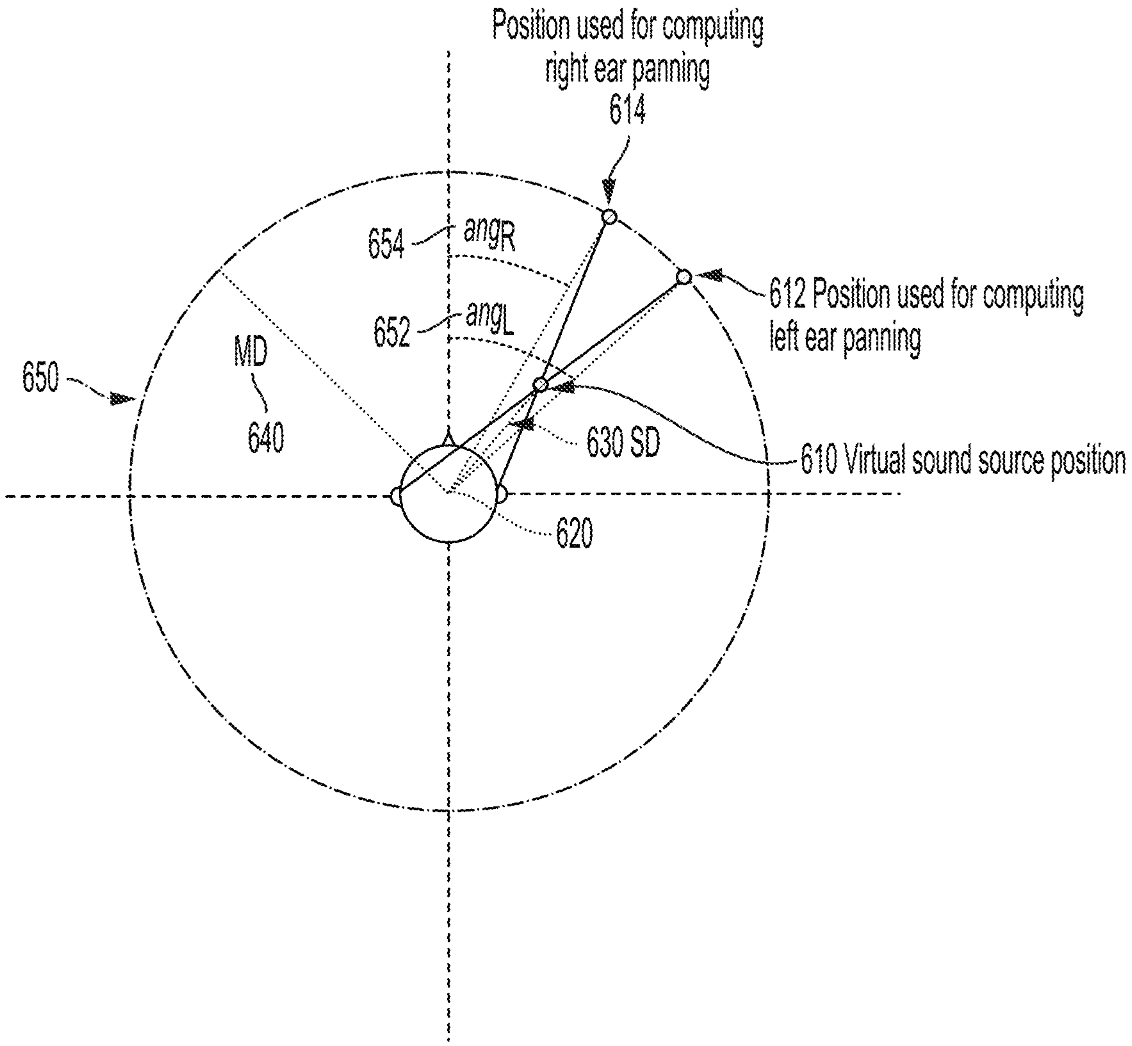

FIG. 6B illustrates a geometry for modeling near-field audio effects from a virtual sound source, according to some embodiments. As shown, a distance 630 from the virtual sound source 610 to a reference point (e.g., "source distance" (SD)) is less than a distance 640 from a VSA 650 to the center 620 of the user's head (e.g., "measured distance" (MD)). In some embodiments, the reference point may be a center of a user's head (620). In some embodiments, the reference point may be a mid-point between two cars of the user. As illustrated in FIG. 6B, a left incident angle 652 ($ang_L$) is greater than a right incident angle 654 ($ang_R$). Angles relative to each ear (e.g., the left incident angle 652 ($ang_L$) and the right incident angle 654 ($ang_R$)) are different than at the MD 640.

In some embodiments, the left incident angle 652 ($ang_L$) used for computing a left ear signal panning may be derived by computing an intersection of a line going from the user's left ear through a location of the virtual sound source 610, and a sphere containing the VSA 650. A panning angle combination (azimuth and elevation) may be computed for 3D environments as a spherical coordinate angle from the center 620 of the user's head to the intersection point.

Similarly, in some embodiments, the right incident angle 654 ($ang_L$) used for computing a left ear signal panning may be derived by computing an intersection of a line going from the user's right ear through the location of the virtual sound source 610, and the sphere containing the VSA 650. A panning angle combination (azimuth and elevation) may be computed for 3D environments as a spherical coordinate angle from the center 620 of the user's head to the intersection point.

In some embodiments, an intersection between a line and a sphere may be computed, for example, by combining an equation representing the line and an equation representing the sphere.

Figure 6C:
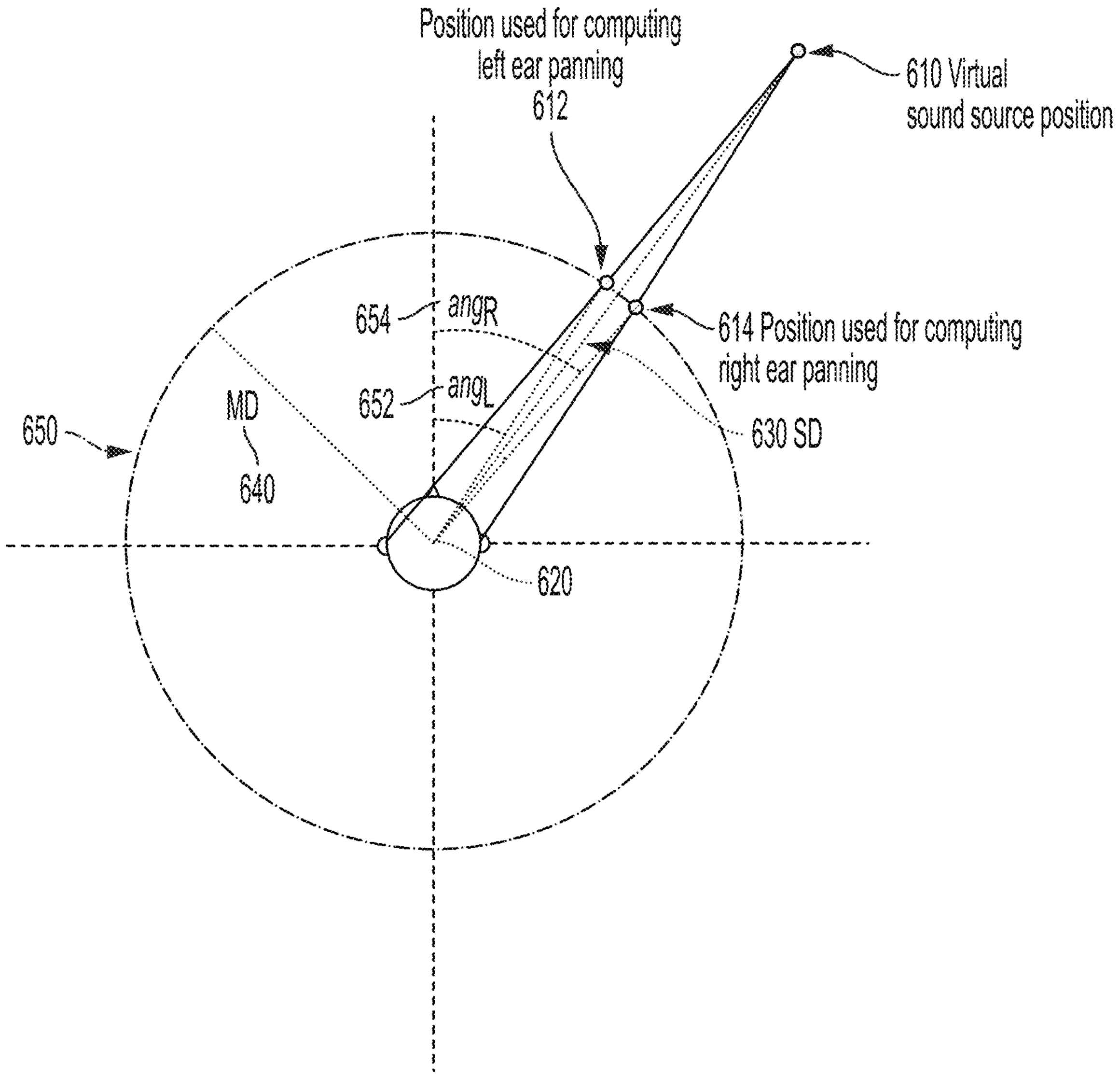

FIG. 6C illustrates a geometry for modeling far-field audio effects from a virtual sound source, according to some embodiments. A distance 630 of the virtual sound source 610 to a center 620 of a user's head (e.g., "source distance" (SD)) is greater than a distance 640 from a VSA 650 to the center 620 of the user's head (e.g., "measured distance" (MD)). As illustrated in FIG. 6C, a left incident angle 612 ($ang_L$) is less than a right incident angle 614 ($ang_R$). Angles relative to each ear (e.g., the left incident angle ($ang_L$) and the right incident angle ($ang_R$)) are different than at the MD.

In some embodiments, the left incident angle 612 ($ang_L$) used for computing a left ear signal panning may be derived by computing an intersection of a line going from the user's left ear through a location of the virtual sound source 610, and a sphere containing the VSA 650. A panning angle combination (azimuth and elevation) may be computed for 3D environments as a spherical coordinate angle from the center 620 of the user's head to the intersection point.

Similarly, in some embodiments, the right incident angle 614 ($ang_R$) used for computing a left ear signal panning may be derived by computing an intersection of a line going from the user's right ear through the location of the virtual sound source 610, and the sphere containing the VSA 650. A panning angle combination (azimuth and elevation) may be computed for 3D environments as a spherical coordinate angle from the center 620 of the user's head to the intersection point.

In some embodiments, an intersection between a line and a sphere may be computed, for example, by combining an equation representing the line and an equation representing the sphere.

In some embodiments, rendering schemes may not differentiate the left incident angle 612 and the right incident angle 614, and instead assume the left incident angle 612 and the right incident angle 614 are equal. However, assuming the left incident angle 612 and the right incident angle 614 are equal may not be applicable or acceptable when reproducing near-field effects as described with respect to FIG. 6B and/or far-field effects as described with respect to FIG. 6C.

Figure 7:
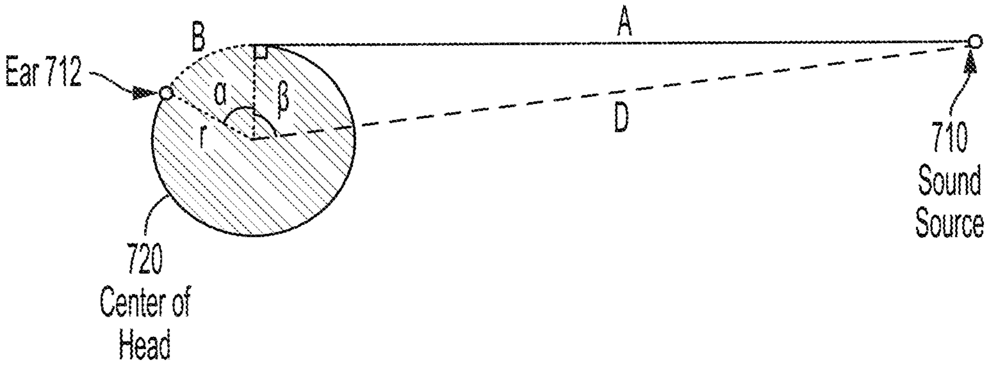
FIG. 7 illustrates an example of computing a distance traveled by sound emitted by a point sound source, according to some embodiments of the disclosure.

FIG. 7 illustrates a geometric model for computing a distance traveled by sound emitted by a (point) sound source 710 to an ear 712 of the user, according to some embodiments. In the geometric model illustrated in FIG. 7, a user's head is assumed to be spherical. A same model is applied to each ear (e.g., a left ear and a right ear). A delay to each ear may be computed by dividing a distance travelled by sound emitted by the (point) sound source 710 to the ear 712 of the user (e.g., distance A+B in FIG. 7) by the speed of sound in the user's environment (e.g., air). An interaural time difference (ITD) may be a difference in delay between the user's two ears. In some embodiments, the ITD may be applied to only a contralateral ear with respect to the user's head and a location of the sound source 710. In some embodiments, the geometric model illustrated in FIG. 7 may be used for any SD (e.g., near-field or far-field) and may not take into account positions of the ears on the user's head and/or head size of the user's head.

In some embodiments, the geometric model illustrated in FIG. 7 may be used to compute attenuation due to a distance from a sound source 710 to each ear. In some embodiments, the attenuation may be computed using a ratio of distances. A difference in level for near-field sources may be computed by evaluating a ratio of a source-to-ear distance for a desired source position, and a source-to-ear distance for a source corresponding to the MD and angles computed for panning (e.g., as illustrated in FIGS. 6A-6C). In some embodiments, a minimum distance from the cars may be used, for example, to avoid dividing by very small numbers which may be computationally expensive and/or result in numerical overflow. In these embodiments, smaller distances may be clamped.

In some embodiments, distances may be clamped. Clamping may include, for example, limiting distance values below a threshold value to another value. In some embodiments, clamping may include using the limited distance values (referred to as clamped distance values), instead of the actual distance values, for computations. Hard clamping may include limiting distance values below a threshold value to the threshold value. For example, if a threshold value is 5 millimeters, then distance values less than the threshold value will be set to the threshold value, and the threshold value, instead of the actual distance value which is less than the threshold value, may be used for computations. Soft clamping may include limiting distance values such that as the distance values approach or go below a threshold value, they asymptotically approach the threshold value. In some embodiments, instead of, or in addition to, clamping, distance values may be increased by a predetermined amount such that the distance values are never less than the predetermined amount.

In some embodiments, a first minimum distance from the cars of the listener may be used for computing gains and a second minimum distance from the cars of the listener may be used for computing other sound source position parameters such as, for example, angles used for computing HRTF filters, interaural time differences, and the like. In some embodiments, the first minimum distance and the second minimum distance may be different.

In some embodiments, the minimum distance used for computing gains may be a function of one or more properties of the sound source. In some embodiments, the minimum distance used for computing gains may be a function of a level (e.g., RMS value of a signal over a number of frames) of the sound source, a size of the sound source, or radiation properties of the sound source, and the like.

Figure 8A:
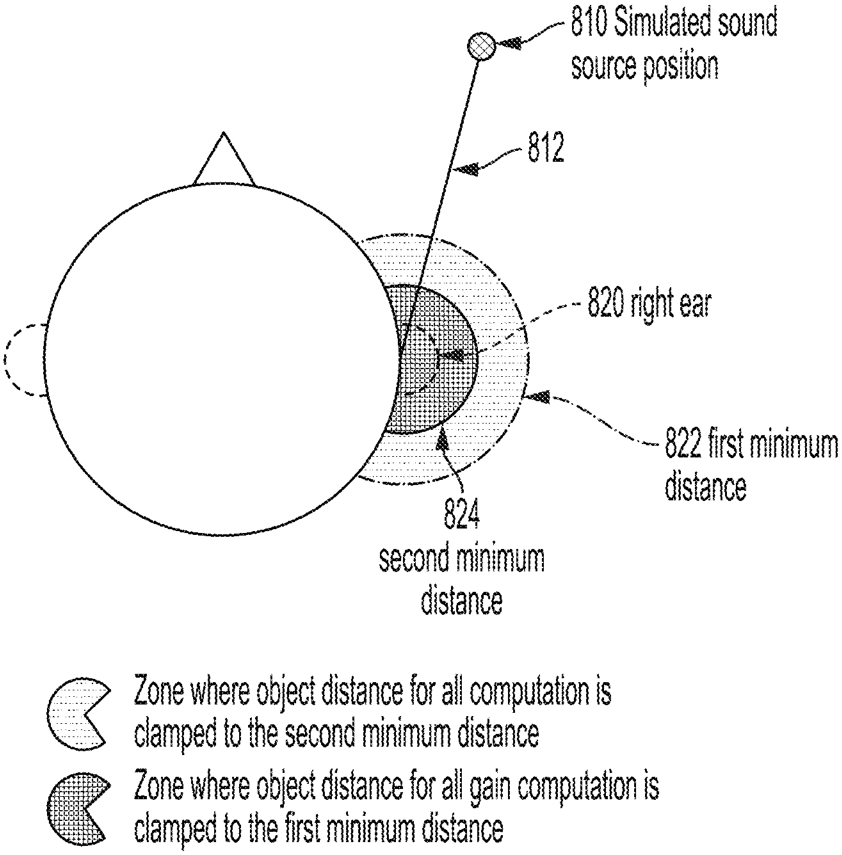
FIGS. 8A-8C illustrate examples of a sound source relative to an ear of a listener, according to some embodiments of the disclosure.
Figure 8B:
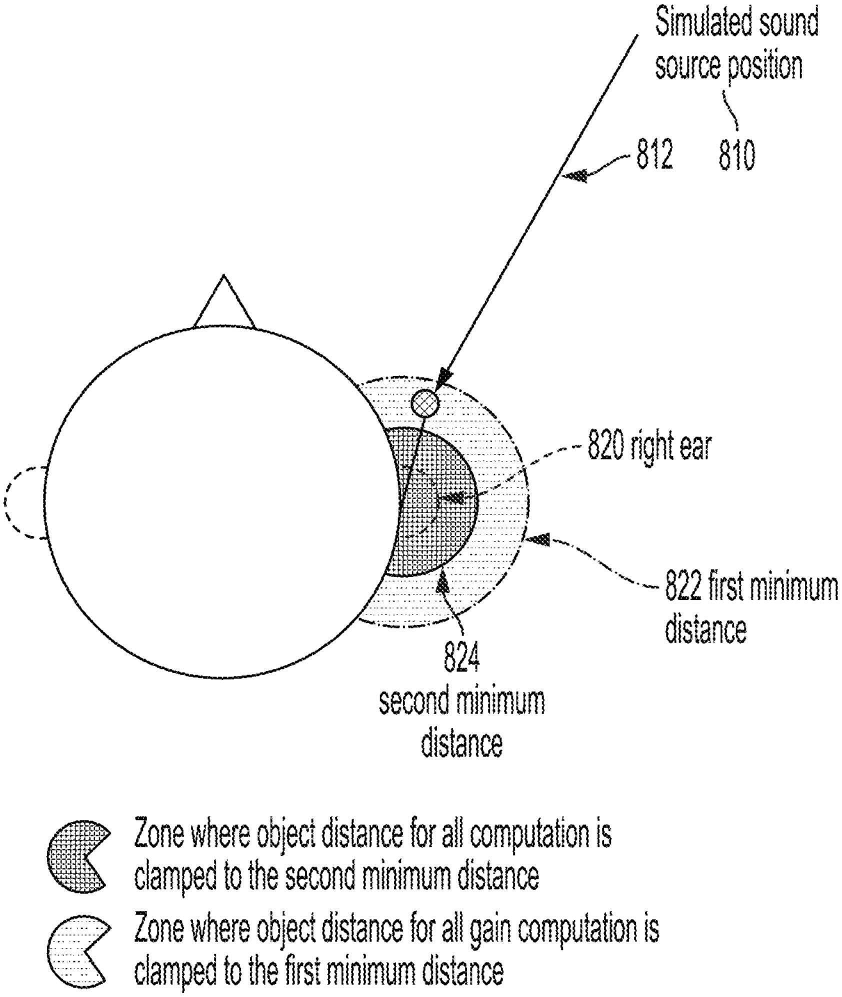
Figure 8C:
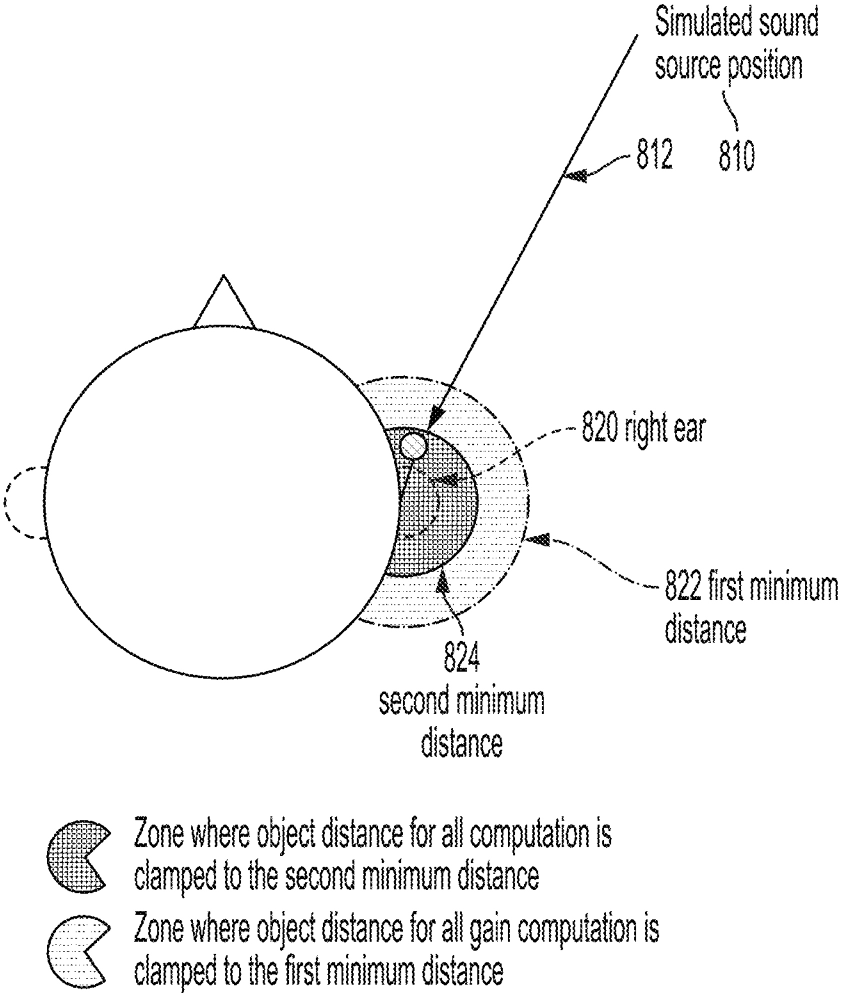

FIGS. 8A-8C illustrate examples of a sound source relative to a right ear of the listener, according to some embodiments. FIG. 8A illustrates the case where the sound source 810 is at a distance 812 from the right ear 820 of the listener that is greater than the first minimum distance 822 and the second minimum distance 824. In this embodiment, the distance 812 between the simulated sound source and the right ear 820 of the listener is used for computing gains and other sound source position parameters, and is not clamped.

FIG. 8B shows the case where the simulated sound source 810 is at a distance 812 from the right ear 820 of the listener that is less than the first minimum distance 822 and greater than the second minimum distance 824. In this embodiment, the distance 812 is clamped for gain computation, but not for computing other parameters such as, for example, azimuth and elevation angles or interaural time differences. In other words, the first minimum distance 822 is used for computing gains, and the distance 812 between the simulated sound source 810 and the right ear 820 of the listener is used for computing other sound source position parameters.

FIG. 8C shows the case where the simulated sound source 810 is closer to the ear than both the first minimum distance 822 and the second minimum distance 824. In this embodiment, the distance 812 is clamped for gain computation and for computing other sound source position parameters. In other words, the first minimum distance 822 is used for computing gains, and the second minimum distance 824 is used for computing other sound source position parameters.

In some embodiments, gains computed from distance may be limited directly in lieu of limiting minimum distance used to compute gains. In other words, the gain may be computed based on distance as a first step, and in a second step the gain may be clamped to not exceed a predetermined threshold value.

In some embodiments, as a sound source gets closer to the head of the listener, a magnitude response of the sound source may change. For example, as a sound source gets closer to the head of the listener, low frequencies at an ipsilateral ear may be amplified and/or high frequencies at a contralateral ear may be attenuated. Changes in the magnitude response may lead to changes in interaural level differences (ILDs).

Figure 9A:
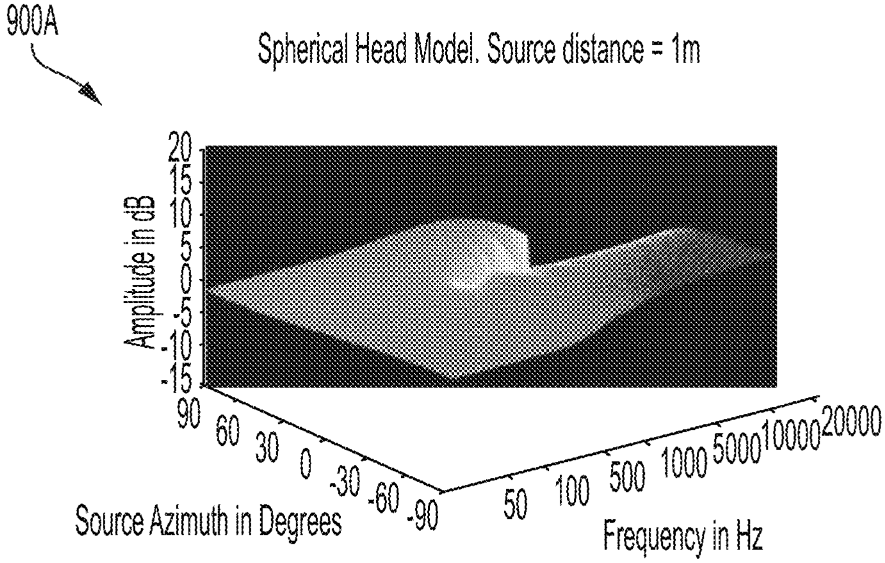
FIGS. 9A-9B illustrate example Head-Related Transfer Function (HRTF) magnitude responses, according to some embodiments of the disclosure.
Figure 9B:
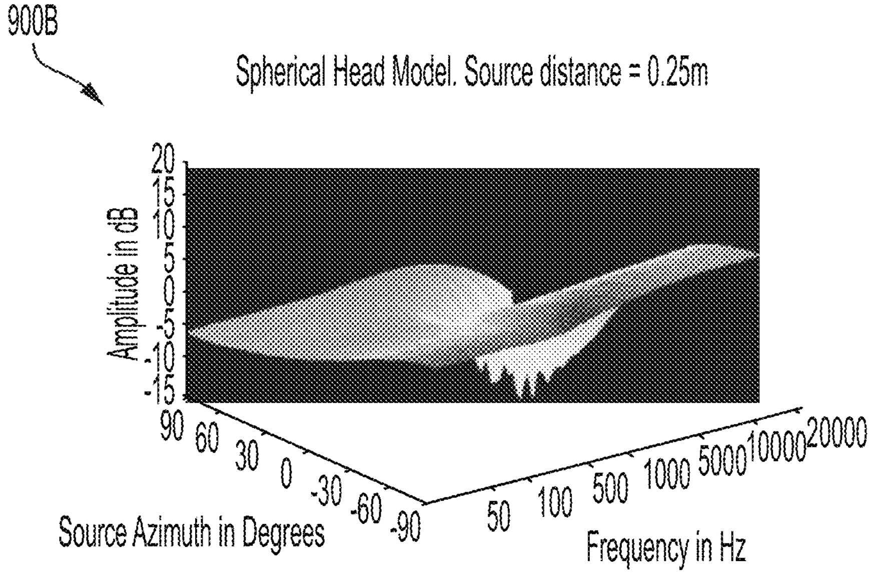

FIGS. 9A and 9B illustrate HRTF magnitude responses 900A and 900B, respectively, at an ear for a (point) sound source in a horizontal plane, according to some embodiments. The HRTF magnitude responses may be computed using a spherical head model as a function of azimuth angles. FIG. 9A illustrates a magnitude response 900A for a (point) sound source in a far-field (e.g., one meter from the center of the user's head). FIG. 9B illustrates a magnitude response 900B for a (point) sound source in a near-field (e.g., 0.25 meters from the center of the user's head). As illustrated in FIGS. 9A and 9B, a change in ILD may be most noticeable at low frequencies. In the far-field, the magnitude response for low frequency content may be constant (e.g., independent of angle of source azimuth). In the near-field, the magnitude response of low frequency content may be amplified for sound sources on a same side of the user's head/ear, which may lead to a higher ILD at low frequencies. In the near-field, the magnitude response of the high frequency content may be attenuated for sound sources on an opposite side of the user's head.

In some embodiments, changes in magnitude response may be taken into account by, for example, considering HRTF filters used in binaural rendering. In the case of a VSA, the HRTF filters may be approximated as HRTFs corresponding to a position used for computing right ear panning and a position used for computing left ear panning (e.g., as illustrated in FIG. 6B and FIG. 6C). In some embodiments, the HRTF filters may be computed using direct MD HRTFs. In some embodiments, the HRTF filters may be computed using panned spherical head model HRTFs. In some embodiments, compensation filters may be computed independent of a parallax HRTF angle.

In some embodiments, parallax HRTF angles may be computed and then used to compute more accurate compensation filters. For example, referring to FIG. 6B, a position used for computing left ear panning may be compared to a virtual sound source position for computing composition filters for the left ear, and a position used for computing right ear panning may be compared to a virtual sound source position for computing composition filters for the right ear.

In some embodiments, once attenuations due to distance have been taken into account, magnitude differences may be captured with additional signal processing. In some embodiments, the additional signal processing may consist of a gain, a low shelving filter, and a high shelving filter to be applied to each ear signal.

In some embodiments, a broadband gain may be computed for angles up to 120 degrees, for example, according to equation 1:

$$\text{gain\_db} = 2.5 * \sin(\text{angleMD\_deg} * 3/2) \quad \text{(Equation 1)}$$

where angleMD_deg may be an angle of a corresponding HRTF at a MD, for example, relative to a position of an ear of the user. In some embodiments, angles other than 120 degrees may be used. In these embodiments, Equation 1 may be modified per the angle used.

In some embodiments, a broadband gain may be computed for angles greater than 120 degrees, for example, according to equation 2:

$$\text{gain\_db} = 2.5 * \sin(180 + 3 * (\text{angleMD\_deg} - 120)) \quad \text{(Equation 2)}$$

In some embodiments, angles other than 120 degrees may be used. In these embodiments, Equation 2 may be modified per the angle used.

In some embodiments, a low shelving filter gain may be computed, for example, according to equation 3:

$$\text{lowshelfgain\_db} = 2.5 * \left(e^{-angleMD\_deg/65} - e^{-180/65}\right) \quad \text{(Equation 3)}$$

In some embodiments, other angles may be used. In these embodiments, Equation 3 may be modified per the angle used.

In some embodiment, a high shelving filter gain may be computed for angles larger than 110 degrees, for example, according to equation 4:

$$\text{highshelfgain\_db} = 3.3 * (\cos((\text{angle\_deg} * 180/pi - 110) * 3) - 1) \quad \text{(Equation 4)}$$

where angle_deg may be an angle of the source, relative to the position of the ear of the user. In some embodiments, angles other than 110 degrees may be used. In these embodiments, Equation 4 may be modified per the angle used.

The aforementioned effects (e.g., gain, low shelving filter, and high shelving filter) may be attenuated as a function of distance. In some embodiments, a distance attenuation factor may be computed, for example, according to equation 5:

$$distanceAttenuation = (HR/(HR - MD)) * (1 - MD/\text{sourceDistance\_clamped}) \quad \text{(Equation 5)}$$

where HR is the head radius, MD is the measured distance, and sourceDistance_clamped is the source distance clamped to be at least as big as the head radius.

Figure 10:
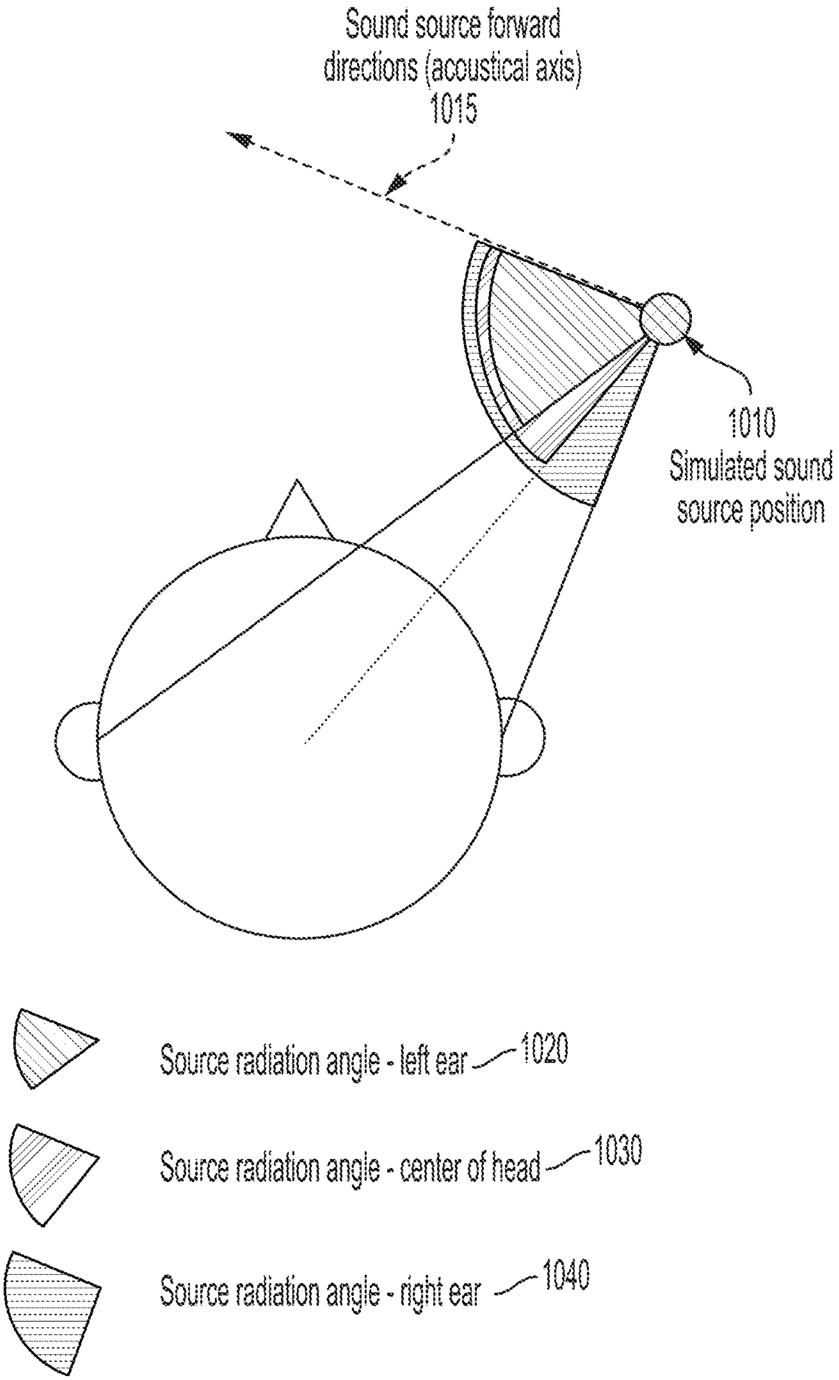
FIG. 10 illustrates a source radiation angle of a user relative to an acoustical axis of a sound source, according to some embodiments of the disclosure.

FIG. 10 illustrates an off-axis angle (or source radiation angle) of a user relative to an acoustical axis 1015 of a sound source 1010, according to some embodiments. In some embodiments, the source radiation angle may be used to evaluate a magnitude response of a direct path, for example, based on source radiation properties. In some embodiments, an off-axis angle may be different for each ear as the source moves closer to the user's head. In the figure, source radiation angle 1020 corresponds to the left ear; source radiation angle 1030 corresponds to the center of the head; and source radiation angle 1040 corresponds to the right ear. Different off-axis angles for each ear may lead to separate direct path processing for each ear.

Figure 11:
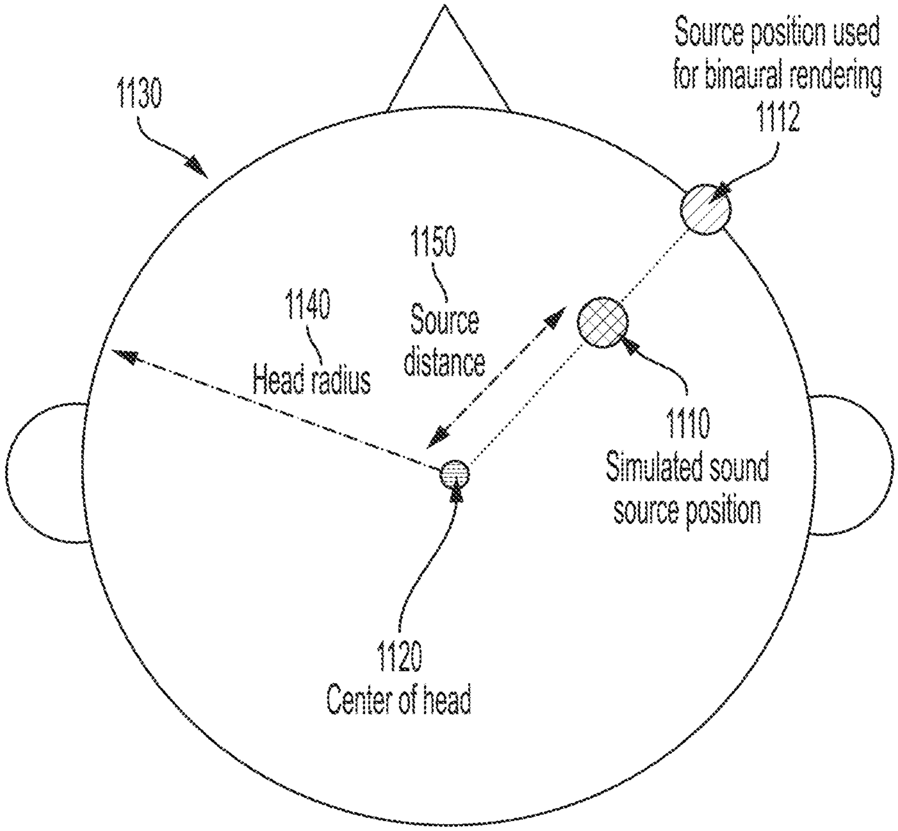
FIG. 11 illustrates an example of a sound source panned inside a user's head, according to some embodiments of the disclosure.

FIG. 11 illustrates a sound source 1110 panned inside a user's head, according to some embodiments. In order to create an in-head effect, the sound source 1110 may be processed as a crossfade between a binaural render and a stereo render. In some embodiments, the binaural render may be created for a source 1112 located on or outside the user's head. In some embodiments, the location of the sound source 1112 may be defined as the intersection of a line going from the center 1120 of the user's head through the simulated sound position 1110, and the surface 1130 of the user's head. In some embodiment, the stereo render may be created using amplitude and/or time based panning techniques. In some embodiments, a time based panning technique may be used to time align a stereo signal and a binaural signal at each ear, for example, by applying an ITD to a contralateral ear. In some embodiments, the ITD and an ILD may be scaled down to zero as the sound source approaches the center 1120 of the user's head (i.e., as source distance 1150 approaches zero). In some embodiments, the crossfade between binaural and stereo may be computed, for example, based on the SD, and may normalized by an approximate radius 1140 of the user's head.

In some embodiments, a filter (e.g., an EQ filter) may be applied for a sound source placed at the center of the user's head. The EQ filter may be used to reduce abrupt timbre changes as the sound source moves through the user's head. In some embodiment, the EQ filter may be scaled to match a magnitude response at the surface of the user's head as the simulated sound source moves from the center of the user's head to the surface of the user's head, and thus further reduce a risk of abrupt magnitude response changes when the sound source moves in and out of the user's head. In some embodiments, crossfade between an equalized signal and an unprocessed signal may be used based on a position of the sound source between the center of the user's head and the surface of the user's head.

In some embodiments, the EQ filter may be automatically computed as an average of the filters used to render a source on a surface of a head of the user. The EQ filter may be exposed to the user as a set of tunable/configurable parameters. In some embodiments, the tunable/configurable parameters may include control frequencies and associated gains.

Figure 12:
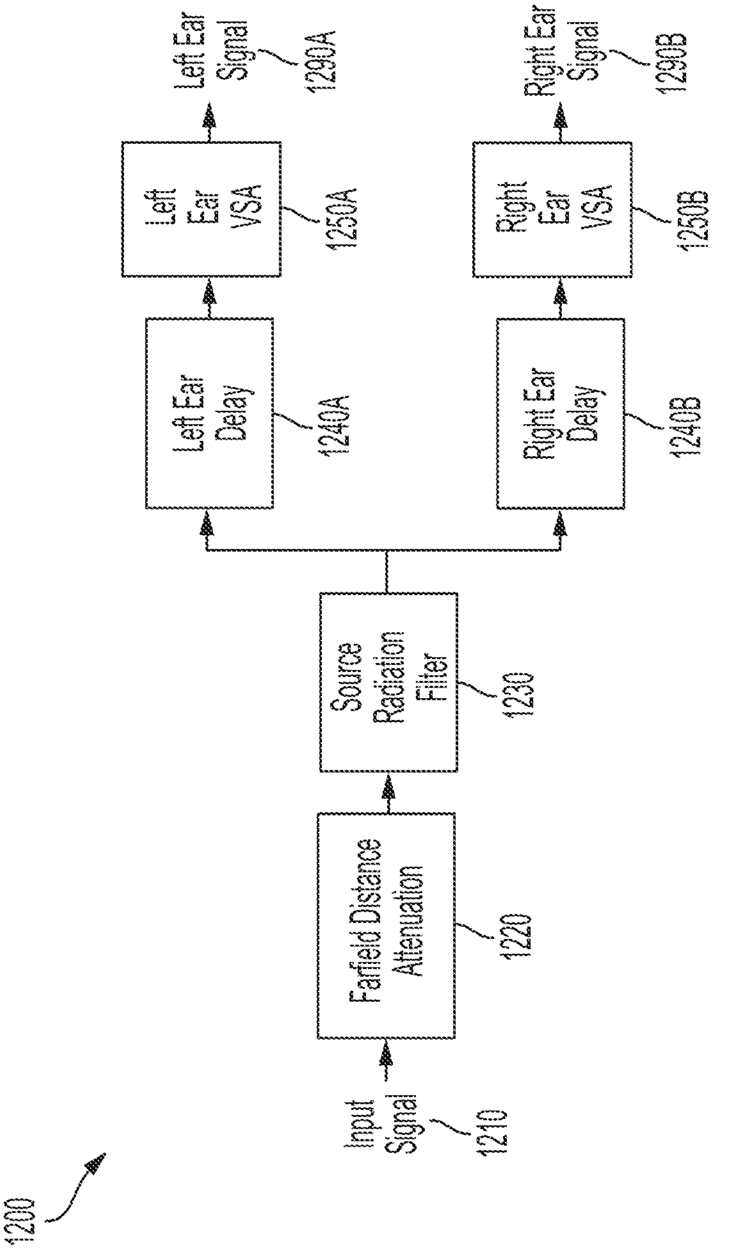
FIG. 12 illustrates an example signal flow that may be implemented to render a sound source in a far-field, according to some embodiments of the disclosure.

FIG. 12 illustrates a signal flow 1200 that may be implemented to render a sound source in a far-field, according to some embodiments. As illustrated in FIG. 12, a far-field distance attenuation 1220 can be applied to an input signal 1210, such as described above. A common EQ filter 1230 (e.g., a source radiation filter) may be applied to the result to model sound source radiation; the output of the filter 1230 can be split and sent to separate left and right channels, with delay (1240A/1240B) and VSA (1250A/1250B) functions applied to each channel, such as described above with respect to FIG. 5, to result in left ear and right ear signals 1290A/1290B.

Figure 13:
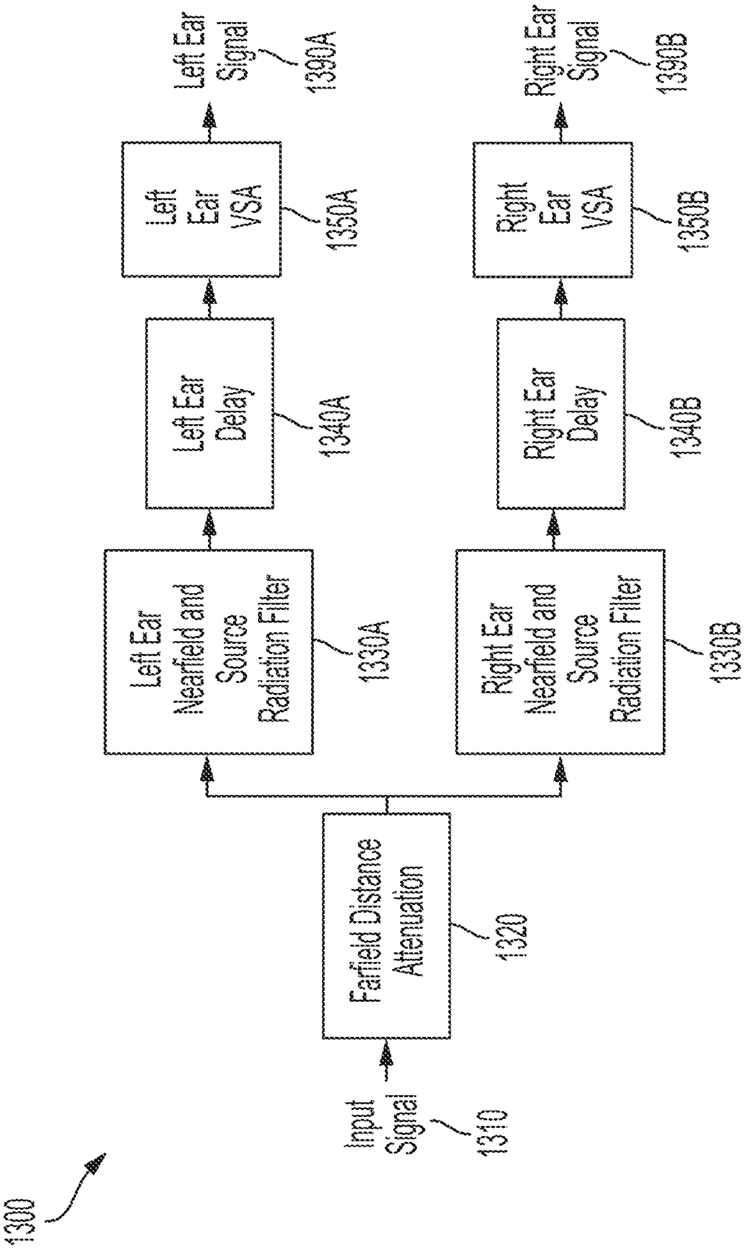
FIG. 13 illustrates an example signal flow that may be implemented to render a sound source in a near-field, according to some embodiments of the disclosure.

FIG. 13 illustrates a signal flow 1300 that may be implemented to render a sound source in a near-field, according to some embodiments. As illustrated in FIG. 13, a far-field distance attenuation 1320 can be applied to an input signal 1310, such as described above. The output can be split into left/right channels, and separate EQ filters may be applied to each ear (e.g., left ear near-field and source radiation filter 1330A for a left ear, and right ear near-field and source radiation filter 1330B for a right ear) to model sound source radiation as well as nearfield ILD effects, such as described above. The filters can be implemented as one for each ear, after the left and right ear signals have been separated. Note that in this case, any other EQ applied to both ears could be folded into those filters (e.g., the left ear near-field and source radiation filter and the right ear near-field and source radiation filter) to avoid additional processing. Delay (1340A/1340B) and VSA (1350A/1350B) functions can then be applied to each channel, such as described above with respect to FIG. 5, to result in left ear and right ear signals 1390A/1390B.

In some embodiments, to optimize computing resources, a system may automatically switch between the signal flows 1200 and 1300, for example, based on whether the sound source to be rendered is in the far-field or in the near-field. In some embodiments, a filter state may need to be copied between the filters (e.g., the source radiation filter, the left ear near-field and source radiation filter and the right ear near-field and source radiation filter) during transitioning in order to avoid processing artifacts.

In some embodiments, the EQ filters described above may be bypassed when their settings are perceptually equivalent to a flat magnitude response with 0 dB gain. If the response is flat but with a gain different than zero, a broadband gain may be used to efficiently achieve the desired result.

Figure 14:
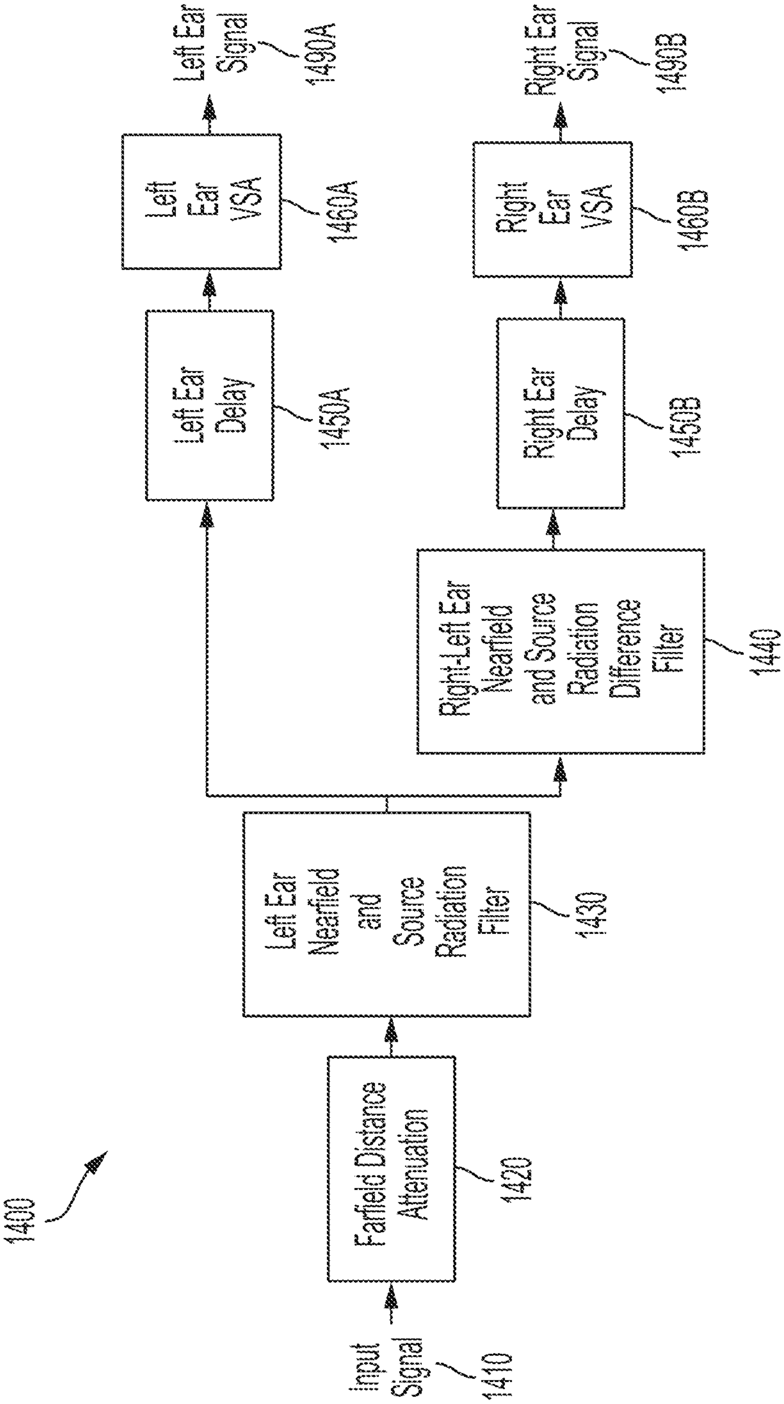
FIG. 14 illustrates an example signal flow that may be implemented to render a sound source in a near-field, according to some embodiments of the disclosure.

FIG. 14 illustrates a signal flow 1400 that may be implemented to render a sound source in a near-field, according to some embodiments. As illustrated in FIG. 14, a far-field distance attenuation 1420 can be applied to an input signal 1410, such as described above. A left ear near-field and source radiation filter 1430 can be applied to the output. The output of 1430 can be split into left/right channels, and a second filter 1440 (e.g., a right-left ear near-field and source radiation difference filter) can then be used to process the right ear signal. The second filter models a difference between right and left ear nearfield and source radiation effects. In some embodiments, a difference filter may be applied to the left ear signal. In some embodiments, a difference filter may be applied to a contralateral ear, which may depend on a position of the sound source. Delay (1450A/1450B) and VSA (1460A/1460B) functions can be applied to each channel, such as described above with respect to FIG. 5, to result in left ear and right ear signals 1490A/1490B.

A head coordinate system may be used for computing acoustic propagation from an audio object to ears of a listener. A device coordinate system may be used by a tracking device (such as one or more sensors of a wearable head device in an augmented reality system, such as described above) to track position and orientation of a head of a listener. In some embodiments, the head coordinate system and the device coordinate system may be different. A center of the head of the listener may be used as the origin of the head coordinate system, and may be used to reference a position of the audio object relative to the listener with a forward direction of the head coordinate system defined as going from the center of the head of the listener to a horizon in front of the listener. In some embodiments, an arbitrary point in space may be used as the origin of the device coordinate system. In some embodiments, the origin of the device coordinate system may be a point located in between optical lenses of a visual projection system of the tracking device. In some embodiments, the forward direction of the device coordinate system may be referenced to the tracking device itself, and dependent on the position of the tracking device on the head of the listener. In some embodiments, the tracking device may have a non-zero pitch (i.e. be tilted up or down) relative to a horizontal plane of the head coordinate system, leading to a misalignment between the forward direction of the head coordinate system and the forward direction of the device coordinate system.

In some embodiments, the difference between the head coordinate system and the device coordinate system may be compensated for by applying a transformation to the position of the audio object relative to the head of the listener. In some embodiments, the difference in the origin of the head coordinate system and the device coordinate system may be compensated for by translating the position of the audio objects relative to the head of the listener by an amount equal to the distance between the origin of the head coordinate system and the origin of the device coordinate system reference points in three dimensions (e.g., x, y, and z). In some embodiments, the difference in angles between the head coordinate system axes and the device coordinate system axes may be compensated for by applying a rotation to the position of the audio object relative to the head of the listener. For instance, if the tracking device is tilted downward by N degrees, the position of the audio object could be rotated downward by N degrees prior to rendering the audio output for the listener. In some embodiments, audio object rotation compensation may be applied before audio object translation compensation. In some embodiments, compensations (e.g., rotation, translation, scaling, and the like) may be taken together in a single transformation including all the compensations (e.g., rotation, translation, scaling, and the like).

Figure 15A:
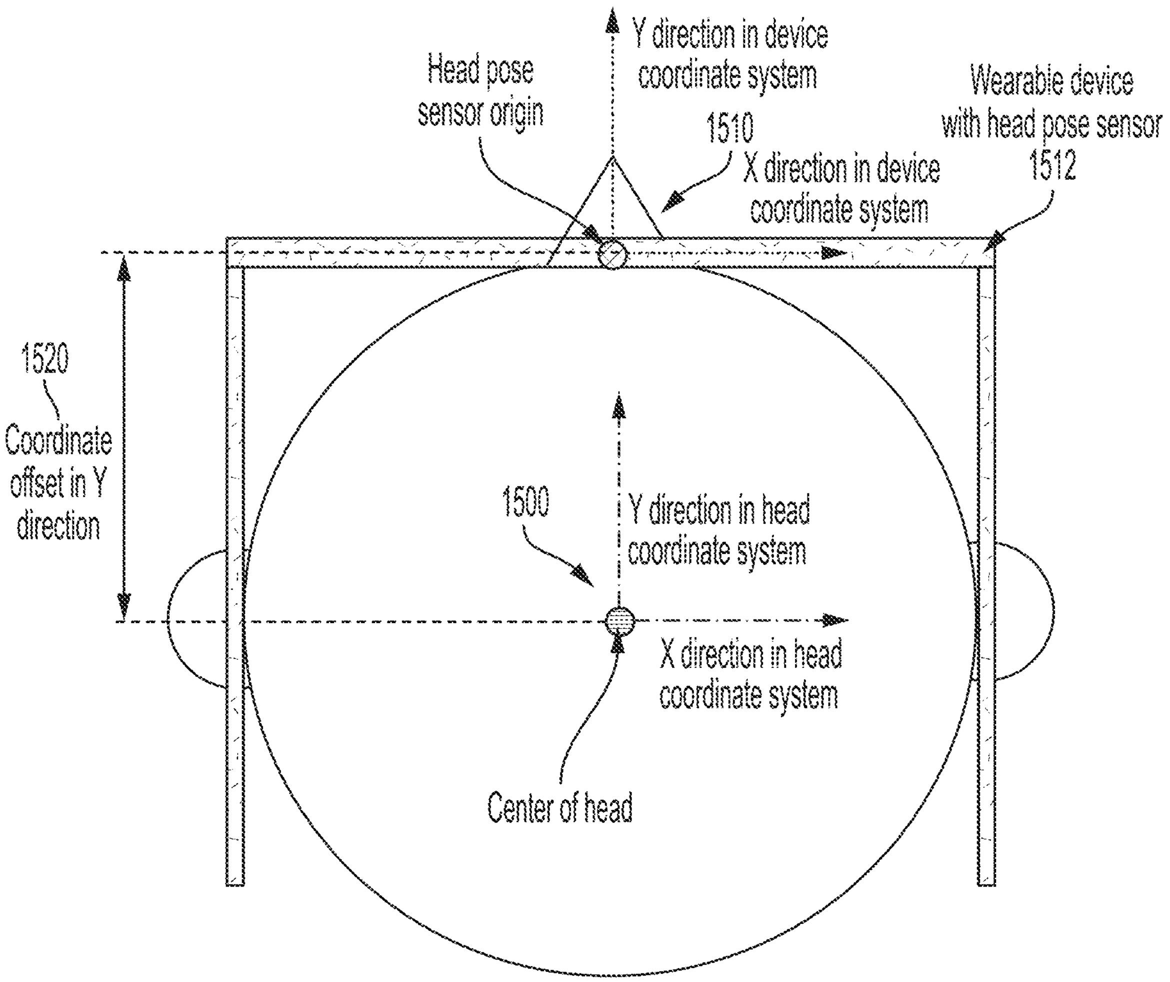
FIGS. 15A-15D illustrate examples of a head coordinate system corresponding to a user and a device coordinate system corresponding to a device, according to some embodiments of the disclosure.
Figure 15B:
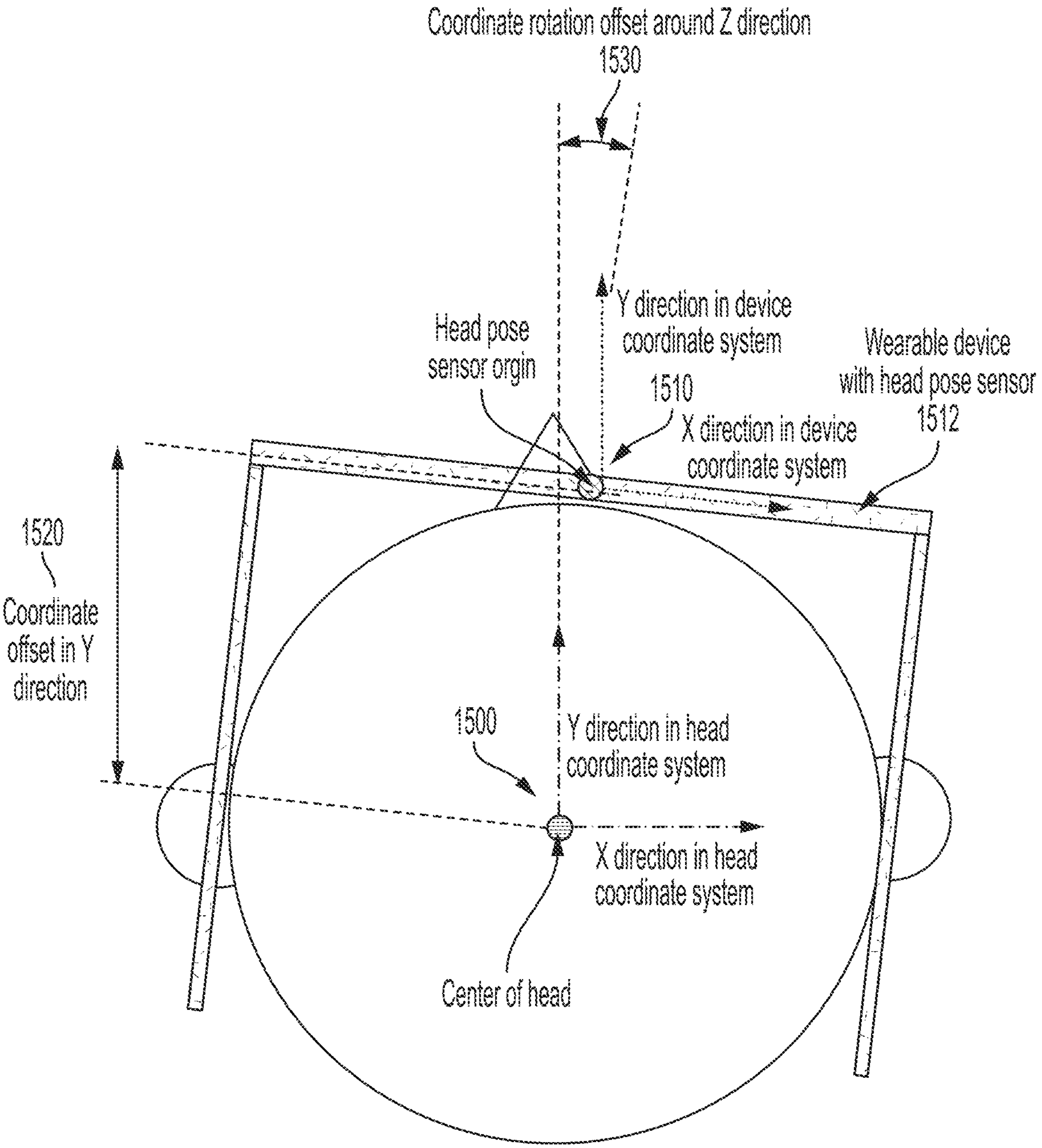
Figure 15C:
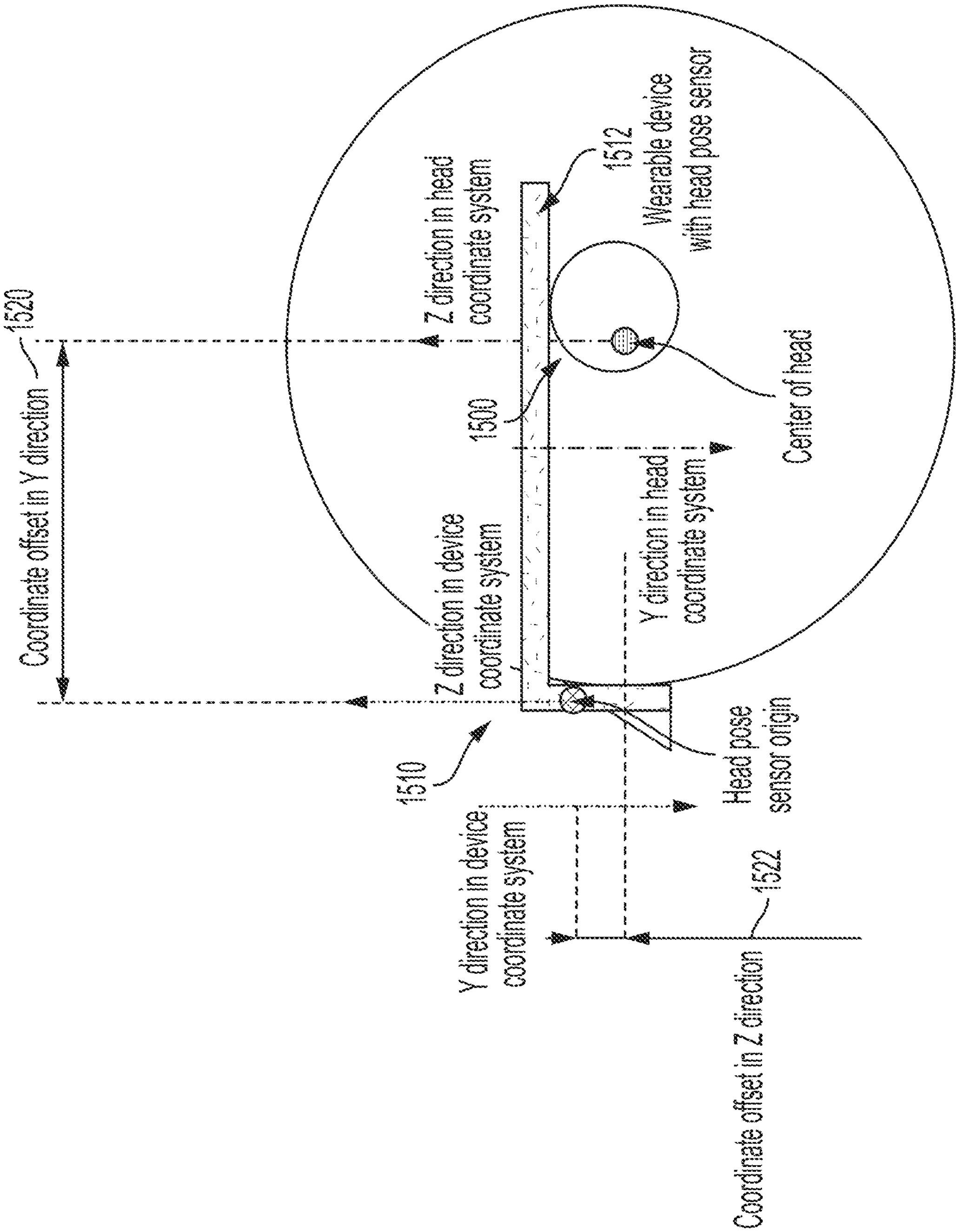
Figure 15D:
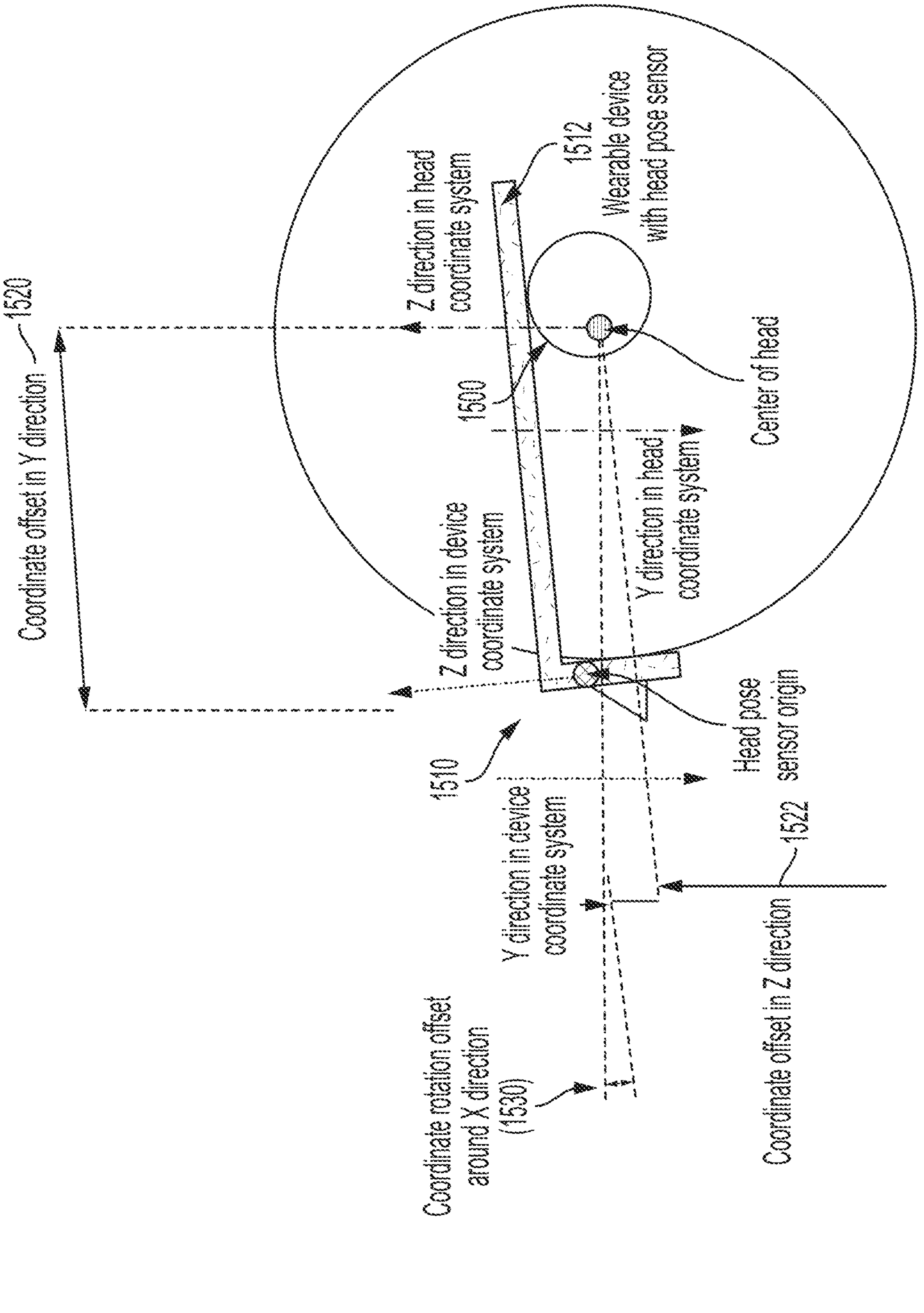

FIGS. 15A-15D illustrate examples of a head coordinate system 1500 corresponding to a user and a device coordinate system 1510 corresponding to a device 1512, such as a head-mounted augmented reality device as described above, according to embodiments. FIG. 15A illustrates a top view of an example where there is a frontal translation offset 1520 between the head coordinate system 1500 and the device coordinate system 1510. FIG. 15B illustrates a top view of an example where there is a frontal translation offset 1520 between the head coordinate system 1500 and the device coordinate system 1510, as well as a rotation 1530 around a vertical axis. FIG. 15C illustrates a side view of an example where there are both a frontal translation offset 1520 and a vertical translation offset 1522 between the head coordinate system 1500 and the device coordinate system 1510. FIG. 15D shows a side view of an example where there are both a frontal translation offset 1520 and a vertical translation offset 1522 between the head coordinate system 1500 and the device coordinate system 1510, as well as a rotation 1530 around a left/right horizontal axis.

In some embodiments, such as in those depicted in FIGS. 15A-15D, the system may compute the offset between the head coordinate system 1500 and the device coordinate system 1510 and compensate accordingly. The system may use sensor data, for example, eye-tracking data from one or more optical sensors, long term gravity data from one or more inertial measurement units, bending data from one or more bending/head-size sensors, and the like. Such data can be provided by one or more sensors of an augmented reality system, such as described above.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosure.

All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

What is claimed is:

1. A method of presenting an audio signal to a user of a wearable head device, the method comprising:

determining a reference point based on a location of the wearable head device; and for each of a respective left ear and right ear of the user:

determining, for a virtual speaker array associated with a sphere concentric with the reference point, the sphere having a first radius, a virtual speaker position substantially collinear with a source location and a position of the respective ear, wherein the determined virtual speaker position comprises a location substantially on a surface of the sphere and the source location corresponds to the audio signal;

determining a transfer function corresponding to the virtual speaker position;

generating, based on the transfer function and based further on the audio signal, an output audio signal for the respective ear;

attenuating the audio signal based on a distance between the source location and the respective ear, wherein the distance is clamped at a minimum value; and presenting the output audio signal to the respective ear of the user via one or more speakers.

2. The method of claim 1, wherein the source location is separated from the reference point by a distance less than the first radius.

3. The method of claim 1, wherein the source location is separated from the reference point by a distance greater than the first radius.

4. The method of claim 1, wherein the source location is separated from the reference point by a distance equal to the first radius.

5. The method of claim 1, wherein said generating the output audio signal comprises applying an interaural time difference to the audio signal.

6. The method of claim 1, wherein said determining the transfer function corresponding to the virtual speaker position comprises selecting the transfer function from a plurality of transfer functions, wherein each transfer function of the plurality of transfer functions describes a relationship between a listener and an audio source, the audio source separated from the listener by a distance substantially equal to the first radius.

7. The method of claim 1, wherein the wearable head device comprises the one or more speakers.

8. The method of claim 1, further comprising identifying the source location corresponding to the audio signal.

9. A system comprising:

a wearable head device;

one or more speakers; and one or more processors configured to perform a method comprising:

determining a reference point based on a location of the wearable head device; and for each of a respective left ear and right ear of the user:

determining, for a virtual speaker array associated with a sphere concentric with the reference point, the sphere having a first radius, a virtual speaker position substantially collinear with a source location and a position of the respective ear, wherein the determined virtual speaker position comprises a location substantially on a surface of the sphere and the source location corresponds to the audio signal;

determining a transfer function corresponding to the virtual speaker position;

generating, based on the transfer function and based further on the audio signal, an output audio signal for the respective ear;

attenuating the audio signal based on a distance between the source location and the respective ear, wherein the distance is clamped at a minimum value; and presenting the output audio signal to the respective ear of the user via the one or more speakers.

10. The system of claim 9, wherein the source location is separated from the reference point by a distance less than the first radius.

11. The system of claim 9, wherein the source location is separated from the reference point by a distance greater than the first radius.

12. The system of claim 9, wherein the source location is separated from the reference point by a distance equal to the first radius.

13. The system of claim 9, wherein said generating the output audio signal comprises applying an interaural time difference to the audio signal.

14. The system of claim 9, wherein said determining the transfer function corresponding to the virtual speaker position comprises selecting the transfer function from a plurality of transfer functions, wherein each transfer function of the plurality of transfer functions describes a relationship between a listener and an audio source, the audio source separated from the listener by a distance substantially equal to the first radius.

15. The system of claim 9, wherein the wearable head device comprises the one or more speakers.

16. The system of claim 9, the method further comprising identifying the source location corresponding to the audio signal.

17. A non-transitory computer-readable medium storing instructions which, when executed by one or more processors, cause the one or more processors to perform a method of presenting an audio signal to a user of a wearable head device, the method comprising:

determining a reference point based on a location of the wearable head device; and for each of a respective left ear and right ear of the user:

determining, for a virtual speaker array associated with a sphere concentric with the reference point, the sphere having a first radius, a virtual speaker position substantially collinear with a source location and a position of the respective ear, wherein the determined virtual speaker position comprises a location substantially on a surface of the sphere and the source location corresponds to the audio signal;

determining a transfer function corresponding to the virtual speaker position;

generating, based on the transfer function and based further on the audio signal, an output audio signal for the respective ear;

attenuating the audio signal based on a distance between the source location and the respective ear, wherein the distance is clamped at a minimum value; and presenting the output audio signal to the respective ear of the user via one or more speakers.

18. The non-transitory computer-readable medium of claim 17, wherein the source location is separated from the reference point by a distance equal to the first radius.

19. The non-transitory computer-readable medium of claim 17, wherein said generating the output audio signal comprises applying an interaural time difference to the audio signal.

20. The non-transitory computer-readable medium of claim 17, wherein the wearable head device comprises the one or more speakers.

* * * * *